(12) United States Patent
Bedi

(10) Patent No.: US 8,719,855 B2
(45) Date of Patent: May 6, 2014

(54) METHODS AND SYSTEMS FOR DISTRIBUTING CONTENT OVER A NETWORK

(76) Inventor: Paramjit Singh Bedi, Glendale, CA (US)

( * ) Notice: Subject to any disclaimer, the term of this patent is extended or adjusted under 35 U.S.C. 154(b) by 0 days.

(21) Appl. No.: 13/449,828

(22) Filed: Apr. 18, 2012

(65) Prior Publication Data

US 2012/0272256 A1 Oct. 25, 2012

Related U.S. Application Data

(60) Provisional application No. 61/477,978, filed on Apr. 21, 2011.

(51) Int. Cl.
*H04N 7/16* (2011.01)
*G06F 3/00* (2006.01)

(52) U.S. Cl.
USPC .................... 725/23; 725/19; 725/46

(58) Field of Classification Search
None
See application file for complete search history.

(56) References Cited

U.S. PATENT DOCUMENTS

| | | | |
|---|---|---|---|
| 5,191,573 A | 3/1993 | Hair | |
| 5,675,734 A | 10/1997 | Hair | |
| 5,774,869 A | 6/1998 | Toader | |
| 5,774,870 A | 6/1998 | Storey | |
| 5,794,210 A | 8/1998 | Goldhaber et al. | |
| 5,838,314 A | 11/1998 | Neel et al. | |
| 5,855,008 A | 12/1998 | Goldhaber et al. | |
| 5,991,736 A | 11/1999 | Ferguson et al. | |
| 6,084,628 A | 7/2000 | Sawyer | |
| 6,102,406 A | 8/2000 | Miles et al. | |
| 6,119,098 A | 9/2000 | Guyot et al. | |
| 6,128,651 A | 10/2000 | Cezar | |
| 6,141,010 A | 10/2000 | Hoyle | |
| 6,161,127 A | 12/2000 | Cezar et al. | |
| 6,161,142 A | 12/2000 | Wolfe et al. | |
| 6,169,542 B1 | 1/2001 | Hooks et al. | |
| 6,178,446 B1 | 1/2001 | Gerszberg et al. | |
| 6,182,050 B1 | 1/2001 | Ballard | |

(Continued)

FOREIGN PATENT DOCUMENTS

WO  WO 02-091257  11/2002

OTHER PUBLICATIONS

U.S. Appl. No. 13/449,957, filed Apr. 18, 2012, Bedi.
U.S. Appl. No. 13/449,813, filed Apr. 18, 2012, Bedi.
Alexander, S. "FREE . . . usualy carry a cost," startribune.com, Jan. 31, 2000, 6 pgs.
Clixsense—earn up to $5 per Click!, http://www.youtube.com/watch?v=mhND8Esjl-k&feature=related (last visited Nov. 14, 2011), 2 pgs.

(Continued)

*Primary Examiner* — Brian Pendleton
*Assistant Examiner* — Jean D Saint Cyr
(74) *Attorney, Agent, or Firm* — Knobbe, Martens, Olson & Bear LLP

(57) ABSTRACT

Methods and systems for distributing content are disclosed. A first plurality of items of content, including video content, is selected based on one or more criteria. Information is accessed indicating respective time lengths and/or qualifying viewing times corresponding to items in the first plurality of items of content. The first plurality of items of content or representations thereof is provided for display on the user terminal in association with the respective time lengths and/or qualifying viewing times. In response to a user selection, a first item of content included in the first plurality of items of content is caused to be played or otherwise distinctly presented by the user terminal in conjunction with a timer corresponding the a respective qualifying viewing time.

27 Claims, 31 Drawing Sheets

(56) References Cited

U.S. PATENT DOCUMENTS

| | | | |
|---|---|---|---|
| 6,216,112 | B1 | 4/2001 | Fuller et al. |
| 6,216,129 | B1 | 4/2001 | Eldering |
| 6,275,854 | B1 | 8/2001 | Himmel et al. |
| 6,385,596 | B1 | 5/2002 | Wiser et al. |
| 6,529,878 | B2 | 3/2003 | De Rafael et al. |
| 6,560,578 | B2 | 5/2003 | Eldering |
| 6,658,568 | B1 | 12/2003 | Ginter et al. |
| 7,062,510 | B1 | 6/2006 | Eldering |
| 7,346,545 | B2 | 3/2008 | Jones |
| 8,229,790 | B2 * | 7/2012 | Wald et al. ............ 705/14.64 |
| 2002/0194058 | A1 | 12/2002 | Eldering |
| 2007/0265910 | A1 | 11/2007 | Varghese |
| 2007/0288951 | A1 * | 12/2007 | Ray et al. ............ 725/23 |
| 2008/0052171 | A1 | 2/2008 | Eldering |
| 2008/0092159 | A1 * | 4/2008 | Dmitriev et al. ............ 725/34 |
| 2008/0221986 | A1 | 9/2008 | Soicher et al. |
| 2009/0044216 | A1 * | 2/2009 | McNicoll ............ 725/5 |
| 2009/0199230 | A1 * | 8/2009 | Kumar et al. ............ 725/32 |
| 2009/0234784 | A1 | 9/2009 | Buriano et al. |
| 2009/0300670 | A1 * | 12/2009 | Barish ............ 725/13 |
| 2010/0017278 | A1 | 1/2010 | Wilen et al. |
| 2010/0114655 | A1 | 5/2010 | D'Elia |
| 2010/0161398 | A1 | 6/2010 | Albert et al. |
| 2010/0306402 | A1 | 12/2010 | Russell et al. |
| 2010/0314276 | A1 | 12/2010 | Wilen |
| 2011/0025037 | A1 | 2/2011 | Wilen |
| 2011/0041153 | A1 * | 2/2011 | Simon et al. ............ 725/46 |
| 2011/0067045 | A1 | 3/2011 | Matheny et al. |
| 2011/0124390 | A1 | 5/2011 | Wilen |
| 2011/0258026 | A1 | 10/2011 | Prince |
| 2012/0054015 | A1 * | 3/2012 | Wu ............ 705/14.27 |
| 2012/0079521 | A1 * | 3/2012 | Garg et al. ............ 725/23 |
| 2012/0197724 | A1 * | 8/2012 | Kendall ............ 705/14.58 |
| 2013/0080262 | A1 * | 3/2013 | Scott ............ 705/14.68 |

OTHER PUBLICATIONS

Earn Money by Clicking Ads Get Paid Instantly to PayPal/Alertpay Account,http://www.youtube.com/watch?v=4KPdxR6UKzg&feature=related (last visited Nov. 14, 2011), 3 pgs.

Ebenkamp, B., "Gold on that thar Web," *Brandweek*, Jul. 15, 1996, v37 n29 p. 17, 3 pgs.

Get Paid to Click $5 to Click Ad's $25 Just for Signing Up | Free Sign up | I've Already Earned, http://www.youtube.com/watch?v=OuLK6aXHDeE&feature=related (last visited Nov. 14, 2011), 2 pgs.

Get Paid to Click 30 Ads a Day, http://www.youtube.com/watch?v=p3gua55MpCk&feature=related (last visited Nov. 14, 2011), 2 pgs.

Get Paid to Click Ads (Make Money Clicking Ads) Free to Join! Earn monthly paychecks file:///Users/parambedi/Desktop/YouTube%20-%20GET%20PAID%20TO%20 . . .20JOIN!%20 Earn%20monthly%20paychecks%20viewing%20ads.webarchive (last visited Nov. 14, 2011), 2 pgs.

Get Paid to View Ads. No Age Restrictions!!-NeoBux, http://www.youtube.com/watch?v=fkfP617HLWY&feature=related (last visited Nov. 14, 2011), 2 pgs.

How to Get $350 Online for Clicking Adds!, http://www.youtube.com/watch?v=BVOKYNYI0uE&feature=related (last visited Nov. 14, 2011), 2 pgs.

Make Money by Clicking Ads-RastaBux, http://www.youtube.com/watch?v=tgTo4hpDI3E&feature=related (last visited Nov. 14, 2011), 3 pgs.

International Search Report and Written Opinion dated Oct. 29, 2012 for International Application No. PCT/US2012/034319.

\* cited by examiner

FIG. 1H

Consumer Categories And Ad Viewing Time Allowed
For Every $1 We Allow 2 Minutes of Ad Viewing Time

| Silver | Gold | Platinum | Black Gold |
|---|---|---|---|
| Viewers Redeem Minutes Only | Viewers Spend $500/month with Winnol | Viewers spend $1,000/month For every $1,000 you get 500 additional minutes, worth = $60 | Viewers Spend $10,000/month |
| 1,000 Min x 12 ¢ = $120 | $500 x 2 Min = 1,000 Min x 12 ¢ = $120 | $1,000 x 2 Min = 2,000 Min x 12 ¢ = $240 + $60 = $300 | Advertisers Who Buy Through Winnol |
| Freebees of $120<br>• Fast Food<br>• Drinks<br>• Promotional Items | Freebees of $120<br>• Fast Food<br>• Drinks<br>• Movie Tickets<br>• Download Songs/Movies | Freebees of $240<br>• Fast Food<br>• Drinks<br>• Gourmet Restaurants<br>• Download Songs/Movies<br>• Vacations<br>• Airline Tickets/Hotel Stay<br>• Concert Tickets/Sporting Events | Free Benefits:<br>• VVIP Status<br>• All Platinum Benefits<br>• Gifts<br>• Celebrity Dinners<br>• First Class Tickets<br>• World Wide Travel<br>• Etc. |
| Buying Power of Consumer $240.00 | Buying Power of Consumer $740.00 | Buying Power of Consumer $1,540.00 | |

*FIG. 8*

| | D1 | | | | | | | | | Dk |
|---|---|---|---|---|---|---|---|---|---|---|
| C1 | Y | N | N | Y | N | N | N | N | Y | N |
| C2 | N | Y | Y | Y | Y | N | Y | N | N | N |
| | N | N | Y | Y | N | Y | N | N | N | N |
| | N | N | N | Y | Y | N | N | N | N | N |
| | N | N | N | Y | N | N | N | N | N | N |
| | N | N | N | Y | N | N | N | N | N | N |
| | N | N | N | Y | N | N | N | N | N | N |
| | N | N | N | Y | N | N | N | N | Y | N |
| Cn | N | N | N | Y | N | N | N | N | N | Y |

Categories (rows) × Demographics (columns)

1. Logical {X, Y} Plane - 2 Dimensional Matrix (For Alpha Binary Yes or N)
2. Default N → User (Advertiser) ONLY has to Specify Y

*FIG. 9A*

3D – Money Allocation – (Logical) Cube

- X-Axis – Demographics
- Y-Axis – Categories
- Z-Axis – Content Providers

Presentation to Advertisers
- Loop per Content Provider
  – Show {X,Y} Plane – per CP
  – Fill in $$ Each item in {X,Y} Plane 4th Dimension: Time – Show specific AD ONLY on Super Bowl

METHODS AND SYSTEMS FOR DISTRIBUTING CONTENT OVER A NETWORK

CROSS-REFERENCE TO RELATED APPLICATIONS

This application claims the benefit under 35 U.S.C. §119 of U.S. provisional patent application Ser. No. 61/477,978, filed Apr. 21, 2011, the contents of which is incorporated by reference in its entirety. This application is related to copending application, entitled METHODS AND SYSTEMS FOR DISPLAYING CONTENT, Ser. No. 13/449,957, and copending application, entitled TOOLBAR FOR DISPLAYING VIDEO CONTENT, Ser. No. 13/449,813 filed on the same date as the present application, the contents of which are hereby incorporated by reference in their entirety.

COPYRIGHT RIGHTS

A portion of the disclosure of this patent document contains material that is subject to copyright protection. The copyright owner has no objection to the reproduction by any one of the patent document or the patent disclosure, as it appears in the patent and trademark office patent file or records, but otherwise reserves all copyright rights whatsoever.

BACKGROUND OF THE INVENTION

1. Field of the Invention

The present invention is generally directed to distributing content, such as video content or image content to remote devices, and in particular to distributing content over a network to remote devices.

2. Description of the Related Art

Content distribution has become a key feature of the Internet and viewing content has become one of the prime uses of user devices, such as mobile phone, tablet computers, and the like. However, distribution of such content utilizes massive and expensive resources, including server farms. Further, the creation of such resources can likewise require a great deal of resources. Conventional systems fail to provide an adequate way to compensate providers of content.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain embodiments described herein map viewers' interests as to online content, including sponsored content, versus content sponsors' desires to reach a targeted, demographically relevant audience. In certain embodiments, such mapping is facilitated by rewarding viewers with redeemable credits for viewing sponsored content. Optionally, users may earn credits per time unit (e.g., per second, per minute, or other time unit) the user spends viewing such sponsored content. An online marketplace may be provided via which the user can "purchase" items using such earned credits and/or currency (wherein the term "currency" as used herein is intended to refer to currency other than earned credit for viewing content; for example, currency may be issued by or on behalf of a governmental entity and may be in the form of dollars, euros, yen, pounds, wan, other legal tender, etc. (including smaller related currency, such as cents; of course a user may be provided with the option of using a credit card to make a currency payment). Thus, certain embodiments enable content desired by viewers to be subsidized by sponsors in exchange for viewing information and other content from sponsors.

In an example embodiment, a first plurality of items of content, which may include sponsored video or static image content, is selected based on one or more criteria, such as the user's profile and targeting information. Information is accessed indicating respective time lengths and/or qualifying viewing times needed to earn a respective specified credit, corresponding to items in the first plurality of items of content. The first plurality of items of content or representations thereof is provided for display on the user terminal in association with the respective time lengths and/or qualifying viewing times. In response to a user selection, a first item of content included in the first plurality of items of content is caused to be played or otherwise distinctly presented (e.g., enlarged in size) by the user terminal. At least partly in response to receiving an indication that a first amount of the first item of content was viewed via the user terminal, a redeemable credit is allocated to the user.

In an example aspect, a content distribution system comprises: an interface to one or databases storing at least video content; a computer system coupled to the interface, and computer system configured to perform operations comprising: receiving an indication that a first user is accessing an online resource using a user terminal; identifying a profile associated with the first user, the profile including: preference information, demographic information, viewing history information, and navigation history information; accessing specified target information provided by one or more content providers, the specified target information including at least target demographics; selecting primary content based at least in part on the first user profile; selecting a first plurality of items of supplementary content based at least in part on the first user profile and the specified target information provided by the one or more content providers, wherein items in the first plurality of items of supplementary content includes a video component; accessing respective metadata associated with the first plurality of items of supplementary content to determine respective time lengths of items in the first plurality of items of supplementary content; causing, at least in part, at least a portion of the selected primary content to be provided for display on the user terminal; causing, at least in part, the first plurality of items of supplementary content or representations thereof to be provided for display on the user terminal; causing, at least in part, information regarding the first plurality of items of supplementary content to be provided for display on the user terminal, the information regarding the first plurality of items of supplementary content including information on the respective time lengths of items in the first plurality of items of supplementary content, and on respective credit amounts to be awarded for viewing items in the first plurality of items of supplementary content; receiving a selection by the first user of a first item of supplementary content in the first plurality of items of supplementary content, wherein the first item of supplementary content includes a first video component and is associated with a first length and a first credit amount related to the first length; causing at least in part the first video component to be provided to the user terminal for playback by the user terminal; receiving an indication as to whether the first video component was played by the user terminal; and if the received indication indicates that the first video component was played by the user terminal, at least partly in response, assigning the first credit amount to the first user. The supplementary content may optionally include an advertisement.

Optionally, the interface is coupled to one or more cloud based databases storing at least video content. The interface may be coupled to at least one database operated by an entity different than the entity that operates the system. The system is configured to inhibit the assignment of the first credit amount to the first user if the received indication indicates that the first video component was not completely played by the user terminal. The system may provide a user interface with which the first user is to interact while the first video component is played by the user terminal or within a specified period of time after the video component has been played; monitor the first user's interactions with the user interface; and if the first user's interactions with the user interface fail to satisfy a first criterion, inhibit assignment of the first credit amount. The operations may further comprise asking the first user at least one question related to the first video component; and if the first user does not respond to the at least one question, inhibiting assignment of the first credit amount. The operations may further comprise providing a user interface configured to receive profile information from the first user, including at least information regarding genres of content the first user prefers and personalities the first user is interested in, and utilizing the received profile information to select both primary and supplemental content. The operations may further comprise offering an item for purchase to the first user substantially immediately after the first item of content is played by the user terminal, wherein the offer includes a price expressed in earned credits for viewing content.

In addition or instead, the operations may further comprise: providing a catalog user interface for display on the user terminal, the catalog user interface including images of a first plurality of articles available for purchase using at least earned credits for viewing content; providing for display, in association with respective articles in the first plurality of articles, respective prices expressed in earned credits for viewing content; receiving a purchase request for a first article, wherein the first article is associated with a first price in the form of a first amount earned credits for viewing content; determining if the first user has sufficient accumulated earned credit to purchase the first article at the first price; at least partly in response to the purchase request and the determination that the first user has sufficient accumulated earned credit to purchase the first article, causing, at least in part, the first article to be provided by the first user and deducting the first amount of earned credit from an account associated with the first user.

In addition or instead, the operations may further comprise: providing a catalog user interface for display on the user terminal, the catalog user interface including an image of at least a first article available for purchase using at least earned credits for viewing content; providing for display, in association with the first article a corresponding respective price expressed in earned credits for viewing content; receiving a purchase request for a first article, wherein the first article is associated with a first price in the form of a first amount earned credits for viewing content; providing information on a first location to the first user with respect to where the first article is available for pickup; processing the purchase request; accessing a photograph of the first user; generating a receipt for the purchase of the first article, the receipt including the photograph of the first user and an identification of the first article, wherein the receipt is to be used to verify, at the first location, that the first user is authorized to pickup the first article.

In addition or instead, the operations may further comprise: providing a catalog user interface for display on the user terminal, the catalog user interface including an image of at least a first article available for purchase using at least earned credits for viewing content; providing for display, in association with the first article a corresponding respective price expressed in earned credits for viewing content and a respective price expressed in legal tender.

In addition or instead, the operations may further comprise: providing a catalog user interface for display on the user terminal, the catalog user interface including an image of at least a first article available for purchase using at least earned credits for viewing content, wherein the first article is selected to be offered to the first user based at least in part on user characteristics specified by a provider of the first article.

In addition or instead, the operations may further comprise: providing a catalog user interface for display on the user terminal, the catalog user interface including entries for a first plurality of articles available for purchase; providing for display, in association with respective articles in the first plurality of articles, respective prices; receiving a purchase request for a first article; at least partly in response to the completion of the purchase of the first article be the first user, determining whether a membership level of the first user is to be enhanced to provide one or more benefits to the first user that the first user was previously not entitled to.

In addition or instead, the operations may further comprise: receiving a value indicating how much supplemental content the first user viewed over a first period of time; at least partly in response to determining that the value indicates that the first user viewed more than a first amount of content, assigning the first user a first enhanced benefits package, the first enhanced benefits package having one or more benefits than the first user was entitled to prior to the assignment of the first enhanced benefits package; at least partly in response to determining that the value indicates that the first user viewed more than a second amount of content, assigning the first user a second enhanced benefits package, the second enhanced benefits package having one or more benefits than the first enhanced benefits package.

Optionally, the representations of the first plurality of items of supplemental content include respective icons and/or screenshots. The first article may be a product or service. The user terminal may include a phone, a laptop computer, a desktop computer, a networked television, and/or a game console. Optionally, the information on the respective time lengths and the information on the respective credit amounts are the same.

The selected primary content may include a plurality of items of primary content, and the operations may further comprise: receiving from the first user an instruction to play a first item of primary content included in the plurality of items of primary content; and at least partly in response to the first user instruction to play the first item of primary content, causing, at least in part, the first item of primary content to be streamed to the user terminal.

In addition or instead, the operations may further comprise causing, at least in part, the first item of supplemental content to be played to the first user at a first website, and if the first user navigates away from the first website to a second website while the first item of supplemental content is being played, causing, at least in part, the first item of supplemental content to be played to the first user at the second website. In addition or instead, the operations may further comprise automatically causing a second first of items of supplemental content to be displayed on the user terminal in place of the first plurality of items a first period of time after the first plurality of items of supplemental content is displayed on the user terminal. In addition or instead, the operations may further comprise providing a multidimensional targeting array for display on a terminal of a first content provider, the multidimensional targeting array including a first axis corresponding to categories and a second axis corresponding to demographics, wherein the first content provider can specify target parameters by selecting a plurality of intersections within the targeting user array and utilizing the selected intersections in determining which users one or more items of supplemental content is to be displayed to.

In an example aspect, a content distribution system comprises: an interface to one or databases storing at least video content; a computer system coupled to the interface, and computer system configured to perform operations comprising: selecting a first plurality of items of content for display on a user terminal of a user; accessing information indicating respective time lengths and/or qualifying viewing times corresponding to items in the first plurality of items of content; causing, at least in part, the first plurality of items of content or representations thereof to be provided for display on the user terminal in association with the respective time lengths and/or qualifying viewing times; in response to a user selection, causing, at least in part, a first item of content included in the first plurality of items of content to be distinctly presented by the user terminal; and at least partly in response to receiving an indication that the first item of content was viewed at least a first amount of time via the user terminal, assigning by the computer system a first amount of redeemable credits to the user, wherein the first amount of redeemable credits magnitude is related to the first amount of time magnitude.

In an example aspect, a method of distributing content comprises: selecting by a computer system a first plurality of items of content for display on a user terminal of a user; accessing by the computer system information indicating respective time lengths and/or qualifying viewing times corresponding to items in the first plurality of items of content; the computer system causing, at least in part, the first plurality of items of content or representations thereof to be provided for display on the user terminal in association with the respective time lengths and/or qualifying viewing times; in response to a user selection, causing by the computer system, at least in part, a first item of content included in the first plurality of items of content to be distinctly presented by the user terminal; and at least partly in response to receiving an indication that the first item of content was viewed at least a first amount of time via the user terminal, assigning by the computer system a first amount of redeemable credits to the user, wherein the first amount of redeemable credits magnitude is related to the first amount of time magnitude.

In an example aspect, a non-transitory computer readable medium stores programmatic instructions thereon, which when executed, are configured to cause a computer system to perform operations comprising: selecting a first plurality of items of content for display on a user terminal of a user; accessing information indicating respective time lengths and/or qualifying viewing times corresponding to items in the first plurality of items of content; causing, at least in part, the first plurality of items of content or representations thereof to be provided for display on the user terminal in association with the respective time lengths and/or qualifying viewing times; in response to a user selection, causing, at least in part, a first item of content included in the first plurality of items of content to be distinctly presented by the user terminal; and at least partly in response to receiving an indication that the first item of content was viewed at least a first amount of time via the user terminal, assigning by the computer system a first amount of redeemable credits to the user, wherein the first amount of redeemable credits magnitude is related to the first amount of time magnitude.

In an example aspect, a content management system comprises: at least one processing device; a non-transitory computer readable medium storing programmatic instructions thereon, that when executed by the at least on processing device, are configured to cause the content management system to perform operations comprises: receiving an indication that a first user is accessing an online resource, wherein the indication is received via a user terminal including a display having a display area, the online resource providing at least a first item of primary visual content for display on the user terminal with an associated size control, wherein the associated size control, when activated by the first user, is configured to cause the first item of primary content to occupy substantially all of the display area; identifying a profile associated with the first user, the profile including preference information, demographic information, or both preference information and demographic information; accessing from a storage medium information provided by one or more supplementary content providers, the specified information including demographics of desired viewers and/or metadata related to content of the one or more items of supplementary content; selecting a first plurality of items of supplementary content based at least in part on the first user profile and the specified information provided by the one or more content providers, wherein one or more items in the first plurality of items of supplementary content includes a video component; accessing respective metadata associated with the first plurality of items of supplementary content to determine respective time lengths and/or qualifying viewing times of items in the first plurality of items; causing, at least in part, the first plurality of items of supplementary content or representations thereof to be provided for display on the user terminal; causing, at least in part, information regarding the first plurality of items of supplementary content to be provided for display on the user terminal, including some or all of the following: respective time lengths of items in the first plurality of items of supplementary content, respective qualifying viewing times for items in the first plurality of items of supplementary content, respective credit amounts to be awarded for viewing items in the first plurality of items of supplementary content, causing, at least in part, the operation of the size control to be modified, wherein at least partly in response to the user activating the size control: the first item of primary content will be increased in size but will not occupy substantially all of the display area so as to leave room on the user terminal display area to display the first plurality of items of supplementary content or representations thereof, or the plurality of items of supplementary content or representations thereof will be caused to overlay the primary content; receiving a selection by the first user of a first item of supplementary content in the first plurality of items of supplementary content, wherein the first item of supplementary content includes a first video component and is associated with a first credit amount; causing at least in part the first video component to be provided to the user terminal for reproduction by the user terminal; receiving an indication as to whether the first video component was reproduced by the user terminal; and if the received indication indicates that the first video component was reproduced by the user terminal, at least partly in response, assigning by the computer system the first credit amount to the first user.

Optionally, the plurality of items of supplementary content or representations are caused to overlay the primary content in a translucent manner. Optionally, the operations further comprise providing a control via which the user can specify that the plurality of items of supplementary content or representations are not to be displayed when the size control is activated. In an example aspect, a method of controlling content windowing, the method comprises: receiving at a computer system an indication that a first user is accessing an online resource, wherein the indication is received via a user terminal including a display having a display area, the online resource providing at least a first item of primary visual content for display on the user terminal with an associated size control, wherein the associated size control, when activated by the first user, is configured to cause the first item of primary content to occupy substantially all of the display area; identifying, by the computer system, a profile associated with the first user, the profile including preference information, demographic information, or both preference information and demographic information; accessing from a storage medium, by the computer system, information provided by one or more supplementary content providers, the specified information including demographics of desired viewers and/or metadata related to content of the one or more items of supplementary content; selecting, by the computer system, a first plurality of items of supplementary content based at least in part on the first user profile and the specified information provided by the one or more content providers, wherein one or more items in the first plurality of items of supplementary content includes a video component; accessing, by the computer system, respective metadata associated with the first plurality of items of supplementary content to determine respective time lengths and/or qualifying viewing times of items in the first plurality of items; the computer system causing, at least in part, the first plurality of items of supplementary content or representations thereof to be provided for display on the user terminal; the computer system causing, at least in part, information regarding the first plurality of items of supplementary content to be provided for display on the user terminal, including some or all of the following: respective time lengths of items in the first plurality of items of supplementary content, respective qualifying viewing times for items in the first plurality of items of supplementary content, respective credit amounts to be awarded for viewing items in the first plurality of items of supplementary content, causing, at least in part, the operation of the size control to be modified, wherein at least partly in response to the user activating the size control: the first item of primary content will be increased in size but will not occupy substantially all of the display area so as to leave room on the user terminal display area to display the first plurality of items of supplementary content or representations thereof, or the plurality of items of supplementary content or representations thereof will be caused to overlay the primary content; receiving by the computer system a selection by the first user of a first item of supplementary content in the first plurality of items of supplementary content, wherein the first item of supplementary content includes a first video component and is associated with a first credit amount; the computer system causing at least in part the first video component to be provided to the user terminal for reproduction by the user terminal; receiving, at the computer system, an indication as to whether the first video component was reproduced by the user terminal; and if the received indication indicates that the first video component was reproduced by the user terminal, at least partly in response, assigning by the computer system the first credit amount to the first user.

In an example aspect, a non-transitory computer readable medium storing programmatic instructions thereon, that when executed by a computer system, are configured to cause the computer system to perform operations comprises: receiving an indication that a first user is accessing an online resource, wherein the indication is received via a user terminal including a display having a display area, the online resource providing at least a first item of primary visual content for display on the user terminal with an associated size control, wherein the associated size control, when activated by the first user, is configured to cause the first item of primary content to occupy substantially all of the display area; identifying a profile associated with the first user, the profile including preference information, demographic information, or both preference information and demographic information; accessing from a storage medium information provided by one or more supplementary content providers, the specified information including demographics of desired viewers and/or metadata related to content of the one or more items of supplementary content; selecting a first plurality of items of supplementary content based at least in part on the first user profile and the specified information provided by the one or more content providers, wherein one or more items in the first plurality of items of supplementary content includes a video component; accessing respective metadata associated with the first plurality of items of supplementary content to determine respective time lengths and/or qualifying viewing times of items in the first plurality of items; causing, at least in part, the first plurality of items of supplementary content or representations thereof to be provided for display on the user terminal; causing, at least in part, information regarding the first plurality of items of supplementary content to be provided for display on the user terminal, including some or all of the following: respective time lengths of items in the first plurality of items of supplementary content, respective qualifying viewing times for items in the first plurality of items of supplementary content, respective credit amounts to be awarded for viewing items in the first plurality of items of supplementary content, causing, at least in part, the operation of the size control to be modified, wherein at least partly in response to the user activating the size control: the first item of primary content will be increased in size but will not occupy substantially all of the display area so as to leave room on the user terminal display area to display the first plurality of items of supplementary content or representations thereof, or the plurality of items of supplementary content or representations thereof will be caused to overlay the primary content; receiving a selection by the first user of a first item of supplementary content in the first plurality of items of supplementary content, wherein the first item of supplementary content includes a first video component and is associated with a first credit amount; causing at least in part the first video component to be provided to the user terminal for reproduction by the user terminal; receiving an indication as to whether the first video component was reproduced by the user terminal; and if the received indication indicates that the first video component was reproduced by the user terminal, at least partly in response, assigning by the computer system the first credit amount to the first user.

In an example aspect, a content management system, comprises: at least one processing device; a non-transitory computer readable medium storing programmatic instructions thereon, that when executed by the at least on processing device, are configured to cause the content management system to perform operations comprising: receiving an indication that a first user is accessing an online resource, wherein the indication is received via a user terminal including a display having a display area, the online resource providing at least a first item of primary visual content for display on the user terminal with an associated size control, wherein the associated size control, when activated by the first user, is configured to cause the first item of primary content to occupy substantially all of the display area; accessing from a storage medium information provided by one or more supplementary content providers, the specified information including demographics of desired viewers and/or metadata related to content of the one or more items of supplementary content; selecting a first plurality of items of supplementary content based at least in part on the specified information provided by the one or more content providers, wherein one or more items in the first plurality of items of supplementary content includes a video component; causing, at least in part, the first plurality of items of supplementary content or representations thereof to be provided for display on the user terminal; causing, at least in part, information regarding the first plurality of items of supplementary content to be provided for display on the user terminal, including at least: respective time lengths of items in the first plurality of items of supplementary content, causing, at least in part, the operation of the size control to be modified, wherein at least partly in response to the first user activating the size control: the first item of primary content will be increased in size but will not occupy substantially all of the display area so as to leave room on the user terminal display area to display the first plurality of items of supplementary content or representations thereof, or the plurality of items of supplementary content or representations thereof will be caused to overlay the primary content; receiving a selection by the first user of a first item of supplementary content in the first plurality of items of supplementary content, wherein the first item of supplementary content includes a first video component and is associated with a first credit amount; causing at least in part the first video component to be provided to the user terminal for reproduction by the user terminal; and receiving an indication as to whether the first video component was reproduced by the user terminal.

In an example aspect, a content management system, comprises: at least one processing device; a non-transitory computer readable medium storing programmatic instructions thereon, that when executed by the at least on processing device, are configured to cause the content management system to perform operations comprising: receiving an indication that a first user is accessing an online resource, wherein the indication is received via a user terminal including a display having a display area, the online resource providing at least a first item of primary visual content for display on the user terminal with an associated size control, wherein the associated size control, when activated by the first user, is configured to cause the first item of primary content to occupy substantially all of the display area; accessing from a storage medium information provided by one or more supplementary content providers, the specified information including demographics of desired viewers and/or metadata related to content of the one or more items of supplementary content; selecting a first plurality of items of supplementary content based at least in part on the specified information provided by the one or more content providers, wherein one or more items in the first plurality of items of supplementary content includes a video component; causing, at least in part, the first plurality of items of supplementary content or representations thereof to be provided for display on the user terminal; causing, at least in part, information regarding the first plurality of items of supplementary content to be provided for display on the user terminal, including at least: respective time lengths of items in the first plurality of items of supplementary content, causing, at least in part, the operation of the size control to be modified, wherein at least partly in response to the first user activating the size control: the first item of primary content will be increased in size but will not occupy substantially all of the display area so as to leave room on the user terminal display area to display the first plurality of items of supplementary content or representations thereof, or the plurality of items of supplementary content or representations thereof will be caused to overlay the primary content; receiving a selection by the first user of a first item of supplementary content in the first plurality of items of supplementary content, wherein the first item of supplementary content includes a first video component and is associated with a first credit amount; causing at least in part the first video component to be provided to the user terminal for reproduction by the user terminal; and receiving an indication as to whether the first video component was reproduced by the user terminal.

In another aspect, an indication that a user is accessing an online resource is received from a user terminal including a display having a display area. The online resource provides a first item of primary visual content for display on the user terminal with an associated size control, wherein the associated size control, when activated by the user, is configured to cause the first item of primary content to occupy substantially all of the display area. The operation of the size control is modified, wherein at least partly in response to the user activating the size control: the first item of primary content will be increased in size but will not occupy substantially all of the display area so as to leave room on the user terminal display area to display a first plurality of items of supplementary content or representations thereof, or the plurality of items of supplementary content or representations thereof will be caused to overlay the primary content.

In an example aspect, a content management system comprises: at least one processing device; a non-transitory computer readable medium storing programmatic instructions thereon, that when executed by the at least on processing device, are configured to cause the content management system to perform operations comprises: providing over a network to a user terminal a toolbar configured to be docked to a browser; enabling the toolbar to occupy a first portion of a browser window while leaving room in the browser window for the browser to display a web page in a second portion of the browser window; providing a plurality of items of supplementary content or representations thereof to be presented via the toolbar while the web page is displayed in the second portion of browser window; receiving a user selection of a first of the plurality of items of supplementary content; and streaming video content corresponding to the first item of supplementary content for display on the toolbar while the web page is displayed in the second portion of browser window.

Optionally, the plurality of items of supplementary content includes one or more items of video content. Optionally, the toolbar is configured to display at least four items of supplementary content at the same time. Optionally, the toolbar is configured to display six items of supplementary content at the same time. Optionally, the operations further comprise: selecting the plurality of items of supplementary content based at least in part on a profile of a user associated with the user terminal; accessing information indicating respective time lengths and/or qualifying viewing times corresponding to the plurality of items of supplementary content; causing at least in part the respective time lengths and/or qualifying viewing times to be displayed in association with the plurality of items of supplementary content, wherein in response to a user selection, a first item of supplementary content included in the plurality of items of supplementary content is played; and at least partly in response to receiving an indication that a first amount of the first item of supplementary content was viewed via the user terminal, assigning one or more redeemable credits to the user. Optionally, the operations further comprise: causing, at least in part, a timer to be displayed on the user terminal, wherein the timer is displayed at least after the first amount of the first item of supplementary content has displayed on the user terminal; determining if the user activated a first control before the timer expired; and at least partly in response to determining the user activated the first control before the timer expired, assigning the redeemable credit to the user. Optionally, the one or more redeemable credits may be redeemed for products. Optionally, the redeemable credits may only be redeemed for products from a specified source. Optionally, the redeemable credits may only be redeemed for products presented in at least one of the first plurality of items of supplementary content. Optionally, the operations further comprise: providing a user interface for display on the user terminal offering a first item for acquisition; providing a value for the item expressed in currency; and providing a value for the item expressed in redeemable credits. Optionally, the operations further comprise: providing a user interface for display on the user terminal offering a first item for acquisition; and providing, for display, a value for the first item expressed in legal tender; providing, for display, a value for the first item expressed in redeemable credits; receiving a user specified number, the user specified number corresponding to a number of redeemable credits, wherein the number of redeemable credits is less than the value for the first item expressed in redeemable credits; and calculating a legal tender amount based at least in part on the user specified number corresponding to the number of redeemable credits, wherein the combination of currency corresponding to the calculated legal tender amount and the number of redeemable credits corresponding to the user specified number is sufficient to acquire the first item.

Optionally, where the redeemable credits may be redeemed for products, the operations further comprise: determining how much the user has spent acquiring items from at least a first source during a first period of time; if the user has spent less than a first threshold, enabling the user to earn redeemable credits up to a first limit; and if the user has spent an amount equal to or greater than the first threshold, enabling the user to earn redeemable credits up to a second limit, wherein the second limit is greater than the first limit. Optionally, the operations further comprise offering the user free products selected based at least in part on an amount of supplementary content viewed by the user, wherein the user does not have to pay for the for the free products using legal tender or redeemable credits. Optionally, the operations further comprise: storing a history of supplementary content viewed by the user; enabling the user to access at least a portion of the history; receiving a selection from the user of at least one item of supplementary content from the accessed history; at least partly in response to the user selection of the at least one item of supplementary content, offering for acquisition at least one product associated with the selected at least one item of supplementary content.

In an example aspect, a method of distributing content comprises: providing by a computer system over a network to a user terminal a toolbar configured to be docked to a browser, wherein the toolbar is configured to occupy a first portion of a browser window while leaving room in the browser window for the browser to display a web page in a second portion of the browser window; providing by the computer system a plurality of items of supplementary content or representations thereof to be presented via the toolbar while the web page is displayed in the second portion of browser window; receiving at the computer system a user selection of a first of the plurality of items of supplementary content; and at least partly in response to receiving the user selection of the first item of supplementary content, locating and streaming by the computer system video content corresponding to the first item of supplementary content for display on the toolbar.

In an example aspect, a non-transitory computer readable medium storing programmatic instructions thereon, that when executed by the at least on processing device, are configured to cause the content management system to perform operations comprising: providing over a network to a user terminal a toolbar configured to be docked to a browser, wherein the toolbar is configured to occupy a first portion of a browser window while leaving room in the browser window for the browser to display a web page in a second portion of the browser window; providing a plurality of items of supplementary content or representations thereof to be presented via the toolbar while the web page is displayed in the second portion of browser window; receiving a user selection of a first of the plurality of items of supplementary content; and streaming video content corresponding to the first item of supplementary content for display on the toolbar while the web page is displayed in the second portion of browser window.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

FIG. 8 illustrates an example tiered membership structure.

FIGS. 9A-9B illustrate example demographics specification user interfaces.

DETAILED DESCRIPTION OF PREFERRED EMBODIMENTS

Figure 1A:
FIGS. 1A-5 illustrate example user interfaces.

The amount and types of media to be delivered to viewers as viewers browse for content continues to increase. For example, a given webpage or other networked document may include videos, text, images, and advertisements (which may be in the form of an image, video, and/or text), all sharing the same screen space on a user terminal (e.g., cell phone, laptop computer, desktop computer, networked television, a game console, etc.). Further, in the case of advertisements, the sheer number of advertisers, as well as the provision of non-relevant advertisement content to viewers, are diluting the value of advertisements for both viewers and advertisers.

Certain embodiments described herein address some or all of the foregoing drawbacks of conventional content distribution technologies. Certain embodiments establish a mapping between viewers' desires as to the content, including sponsored content (e.g., video or still advertisements, product lists, etc.), they may want to view versus the advertisers' desires to reach a targeted, demographically relevant audience. In certain embodiments, such mapping is facilitated by rewarding viewers with redeemable credits for viewing content (e.g., sponsored content). Optionally, users may earn credits per time unit (e.g., per second, per minute, or other time unit) the user spends viewing such content. The user may continuously accumulate such credits from viewing multiple items of content, so as to be able to save up credits to purchase or redeem more "expensive" items with such accumulated earned credit.

For example, the content for which a user earns credit may comprise targeted advertisements selected by and/or distributed by a content distribution system, and the redeemable credits may be subsidized, in whole or in part, by advertisers whose advertisements are being viewed. The user may be able to apply such earned credits to purchase certain items (wherein the term "purchase" is intended to further include renting, unless the context indicates otherwise). By way of illustration, the user may be able to apply such earned credits to purchase articles, such as products associated with the advertisers (e.g., food products, electronics, clothing, etc.) and services. For example, in addition to being able to use credits to purchase products, the credits may be used to purchase the right to play online games or to purchase virtual items in such games, where the earned credit may be used as virtual currency. In addition, the user may be able to combine such earned credits with currency/legal tender, in order to purchase items or services (e.g., access to online games, movies, television shows, etc.). For example, an online marketplace may be provided, wherein a given item (e.g., a product or service) may have a posted earned credit price, currency price, and/or a combined earned credit and currency price.

Advertisers and retailers may be provided with a user interface via which they can specify what items may be sold via the content distribution system online marketplace and may further specify profiles of users to whom the items are to be offered for sale and/or to whom the items are not to be offered for sale. The advertisers and retailers may also specify profiles of users to whom the items are to be offered at a specified discount.

Certain embodiments track the accumulation and expenditures of earned credits, as well as the items purchased by users using the earned credit and/or currency for reporting to the user, a system operator, advertisers, and/or other entities. In addition, the system may track the status of ordered items (e.g., whether the item has been shipped, received, returned, etc.) and report the status to the user or other authorized persons/entities.

The user may enter, via a user account interface, preference information with respect to content and/or products/services. For example, with respect to content, the user may specify specific movies, television shows, or webcasts the user would like to view, genres of movies or shows the user likes (e.g., comedy, drama, action, science fiction, animation, etc.), specific celebrities/stars/athletes the user likes, and/or specific organizations the users likes (e.g., religious institutions, academic institutions, sports teams, companies, etc.). With respect to products, the user may specify certain brands the user likes and/or types of products the user likes (e.g., automobiles, electronics, cooking equipment, clothing, food, etc.). The user may also provide demographic information (e.g., age, gender, income, marital status, profession, location, etc.), which the system may use to generate/supplement a profile of the user. The user may also specify a desired minimum or maximum length of primary content (content that is primarily non-advertisement content, such as movies, television shows, news, etc.) or supplemental content (e.g., sponsored content) the user wants to view. For example, the user may specify that the user does not want to view sponsored content having a viewing length of more than 15 seconds, even if the user will thereby earn less credit per item of sponsored content viewed than if the user was willing to view sponsored content 30 seconds long or longer. In this example, the system will identify sponsored items of 15 seconds or less in length to present to the user and from which the user may select.

In addition to or instead of the system utilizing expressly specified preferences from the user to select content (e.g., movies, television shows, and/or advertisements) for display to the user, information obtained from monitoring user actions or characteristics may be used by the system to select content. By way of illustration, the system may monitor the user's web page navigation history, purchases, viewing history, other user usage information, the user's location, mood (as indicated by the user clicking on a mood control indicating if the user is happy, sad, energized, lonely, etc.), etc., and utilize some or all of the foregoing in selecting content or suggesting to be presented to the user. The system may optionally utilize heuristics in selecting advertisements for a given user or group of users.

Multiple advertisements may be presented in conjunction with other content, such as a movie, television show, news item, photograph, etc. Some or all of the advertisements may optionally be in the form of a video advertisement. For example, the user may be presented with multiple advertisements from which to select, where the advertisements are initially represented in a visual menu using respective text and/or static graphics, such as thumbnail images or logos. In addition, the length of each advertisement (and, if different, the qualifying viewing time needed to earn a corresponding credit) and the amount of credit to be earned by viewing the advertisement may be displayed in association with a respective advertisement (including with the thumbnail image or other representation of the advertisement). Optionally, the earned credit may itself be expressed as a quantity of time units (e.g., the user earns 1 minute credit for each minute watched, and so that if the user watches 10 minutes of advertising content, the user may have 10 minutes of credit). Different advertisements may have different lengths (in units of time) and may earn a viewing user different amounts of credits.

The user may click on or otherwise select one of the advertisements. If the advertisement is a video advertisement (which may be an animated advertisement and/or a filmed advertisement), the advertisement begins playing in response to the user selection. The advertisement may be streamed from the content distribution system or from a third party system. For example, the advertisement (and other video content) may be compressed and encoded (e.g., using a video codec, such as an MPEG 4 codec, a H.264 codec, to compress the video portion, and using an audio codec, such as MP3 or Vorbis, to compress the audio portion), and assembled in a container/bitstream format (e.g., AVI, Ogg, MOV, ASF, FLV, SWF, FLV, F4V, MP4, MPEG-4, MP4, M4V, F4F, 3GPP etc.). The bitstream may then be delivered from a streaming server to a streaming client using a transport protocol, such as Real Time Streaming Protocol (RTSP). In addition to or instead of streaming content for substantially immediate display, the advertisement (or other content) may be downloaded to the user device for later playback. The media may be provided using progressive video (e.g., using FLV, F4V, MP4, MP4V-ES, M4V, 3GPP, 3GPP2, QuickTime/MOV, or other format). If the advertisement is a still image, the image may be provided using a variety of formats (e.g., PNG, GIF, JPG, etc.). A sponsored still image selected by the user may optionally be expanded (e.g., to fill a majority of substantially all of the display or window), in order to make the selected image easier to view and to distinguish the selected image from other advertisements. Optionally, images and videos can be presented in 3D.

While a given advertisement is being played and/or is provided in expanded form so that the user may earn viewing credit, a countdown timer may be displayed as well, indicating how much longer the user needs to view the advertisement in order to receive the associated earned credit and/or indicating the time length of the advertisement.

The system tracks and records how long the user watches the advertisement/sponsored content. Optionally, the user earns credit proportional to the amount of time the user views the advertisement, as calculated by the system. Optionally, the user instead does not earn any credit for viewing a given advertisement unless the user views the entire advertisement or a specified amount of qualifying time, at which point the user earns the stated earned credit amount. For example, if the system detects that the user has navigated away from the advertisement or has stopped the advertisement, the system determines the user has not viewed the entire advertisement. In addition or instead, the user may be instructed to click on a "viewed" control within a certain amount of time after the advertisement has finished playing in order to be allocated the earned credits. Otherwise, the system will not allocate the user the earned credits associated with watching the advertisement.

In certain embodiments, as a user scrolls through a page displayed on the user's device, an advertisement inserted by the system remains displayed at substantially the same location to enable the user to continuously view the advertisement, even while scrolling through a webpage. Further, as a user navigates from page to page and site to site, a given advertisement may follow the user and be displayed on each page or site (or a selected subset thereof). For example, the advertisements may be displayed via a toolbar downloaded (e.g., from the content distribution system or other network resource) and docked to the user's browser. The toolbar may display the advertisements in an area occupying about 25% of the browser window (although it may be sized to occupy more than 25% or less than 25% of the browser window). Similarly, as a user navigates from page to page and site to site, the user's profile may follow the user so that the content distribution system may continue provide targeted advertisements to the user even as the user navigates from site to site and page to page.

Optionally, in certain embodiments, once an advertisement (or other specified content) has been viewed by the user, the user is automatically (or in response to a user activation of a control provided by the system) presented with a page or other interface via which the user can (i) add the item advertised and/or one or more different items to the user's wish list; (ii) request more information regarding the item advertised and/or one or more different items; or (iii) add the item advertised and/or one or more different items to the user's shopping cart for purchasing (and complete the purchase). For example, the interface may be an online catalog user interface. Optionally, the different item(s) offered to the user may be selected by the system based at least in part on one or more of the following: the user's profile (e.g., user specified preferences, user behavior, user characteristics), advertiser/retailer specified criteria, and/or other criteria. The item page may display a price expressed in earned credits, dollars (or other legal tender), and/or a combination of earned credits. If more than one product is to be displayed to the user, then multiple products may be presented via a single page, or each product may be presented on a dedicated page, and the user can navigate among the product pages. The user then may purchase one or more of the products, and the user will be charged accordingly (in earned credits and/or in legal tender).

Users may pool their credits earned by viewing content, such as advertisements, with credits earned by other users earned by viewing content in order to purchase an item. Optionally, pooling may be selectively allowed for purchasing certain specified items, but not for other items. Optionally, user may be charged earned credits and/or cash in order to pool earned credits to make a purchase. For example, users may be charged a surcharge that is a flat fee or a percentage (e.g., 20%) of the earned credit purchase price. Optionally, a user may begin a group or be appointed to run a group. For example, user running the group may approve requests to join the group and/or send electronic invitations to join the group. Various organizations, such as non-profits (e.g., schools, religious institutions, etc.) may form a group.

Certain illustrative embodiments will now be discussed with reference to the figures.

FIG. 1A illustrates an example home page of a user. As discussed in greater detail below, the information presented via the home page may be selected based in part on the user's profile. The home page may include links 102A, 116A to other areas of the content provider site (e.g., games, news, magazine, music, videos, store, etc.), where the user can access the other areas may activating a corresponding link. A login/logout control 104A may be provided as well. An alerts control (not shown) enables the user to access message relevant to the user (e.g., regarding the user's account or regarding news of upcoming events). Optionally, a specific website may be provided for users under a specified age (e.g., under 18 years old, under 3 years old, etc.) with appropriate content and optionally without requiring the user to login.

Optionally, viewers/users of the content distribution system may be required to be logged in prior to being able to earn credits by watching advertisements presented by the system. In certain optional embodiments, once users are logged in, login information is maintained locally on a viewer's system via the use of browser cookies. Therefore once logged in, as viewers visit websites that utilize the credit-based viewing technologies, those websites will automatically display advertisements that enable the user to accumulate of minutes or time credits based on the login information stored in the local cookie file, on information stored in the content distribution system database, and/or and on the credits associated with viewing such advertisements. In addition, such websites may utilize the information stored in the cookie to access demographic information associated with the user and to use such demographic information to serve up demographically targeted advertisements to the user.

In certain embodiments, because the system tracks the validity of a viewer's membership (using identifying information retrieved from a cookie stored on the user's terminal) to the content distribution system, advertisements that are capable of earning redeemable minutes or time credits will be displayed by websites as long as a viewer has a valid login account, whether logged in or not. In certain embodiments, if the viewer is logged in at the time the enabled advertisement is displayed, the action of viewing and earning redeemable minutes or time credits will take effect immediately. In certain embodiments, if the viewer is currently not logged in at the time the enabled advertisement is displayed, the viewer will be asked to login first before such redeemable minutes or time credits can be earned.

A search field 106A may be provided via which the user can search across the website. For example, the user can search for products or content, which, if located, will be provided in a search result listing to the user, wherein a given search result may have an associated link to a corresponding resource (e.g., a web page or item of content). The user can select a search result item to access a corresponding linked-to resource.

A featured items area 108A may be presented that optionally includes primary content and/or videos being promoted. For example the featured items area 108A may include a trailer for an upcoming movie, an episode of a television series being promoted, a clip from a television show, still images from a movie or of a movie set, a text article on a celebrity (optionally also include still images and/or videos), etc. In this example, the representations of the featured items include still images from the featured items, with relevant text and/or logo overlaid thereon.

If a user selects one of the featured items, it will begin playing (if a video or an audio track), an image album will be displayed (if the featured item is still images), or the text will be displayed (if the featured item is a text document). When the featured item is played or displayed, the system or client software may cause the featured item to be expanded in size to occupy a larger portion of the window in which the home page is displayed. For example, the playing or displayed featured item may be sized to occupy one quarter, one half, or substantially all of the window. In certain embodiments, the selected featured item is expanded in size, but enough room is reserved to display at least one or more sponsored items of content (e.g., such as the sponsored items of content area illustrated in FIG. 1G). As discussed elsewhere, some or all of the featured items may be selected based at least in part on the user's profile and/or on criteria specified by respective providers of the featured items.

A "people" area 110A displays images of celebrities (e.g., athletes, actors, singers, writers, etc.). If the user selects a photograph, a page describing the celebrity (e.g., latest album, history, awards, etc.) and providing celebrity related content (e.g., interviews, music videos, etc.), may be presented. Optionally, the celebrity page may be a page from a website controlled by the celebrity, and monetization resulting from the user accessing the celebrity page may be shared among the celebrity, the content distribution system operator, the user, and/or other entities.

The home page may also have a "what's new" section 112A that provides recent information regarding content available via the content distribution system site.

A "company" area 114A displays names and/or logos companies, who may pay a fee to have their name/logo included. If the user selects a company name/logo, a page describing the company (e.g., products/services offered, number of employees, awards received, etc.) and providing company related content (e.g., new products being offered, new store locations, etc.), may be presented.

An account control is optionally provided that, when activated, provides the user with the user's account information (e.g., total credits earned, total video watching time, amount of unredeemed credits, amount of items purchased by the user (expressed in cash currency and/or credits) order status for purchased items, user profile information (which the user may edit and update), user titles/membership level, items on the user's wish list, earned/available free items, user-specific message, system messages, etc.).

Figure 1B:
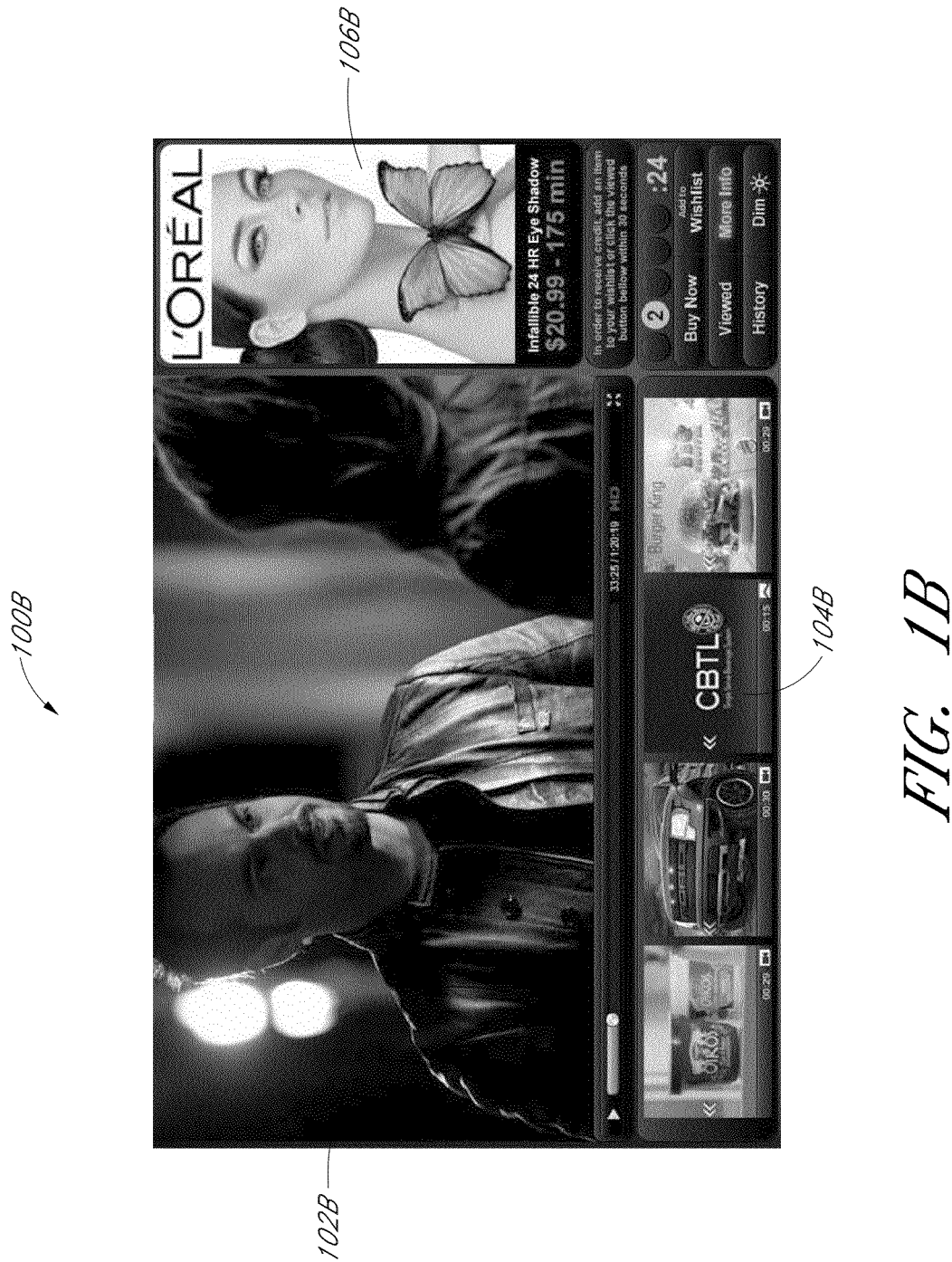
Figure 1C:
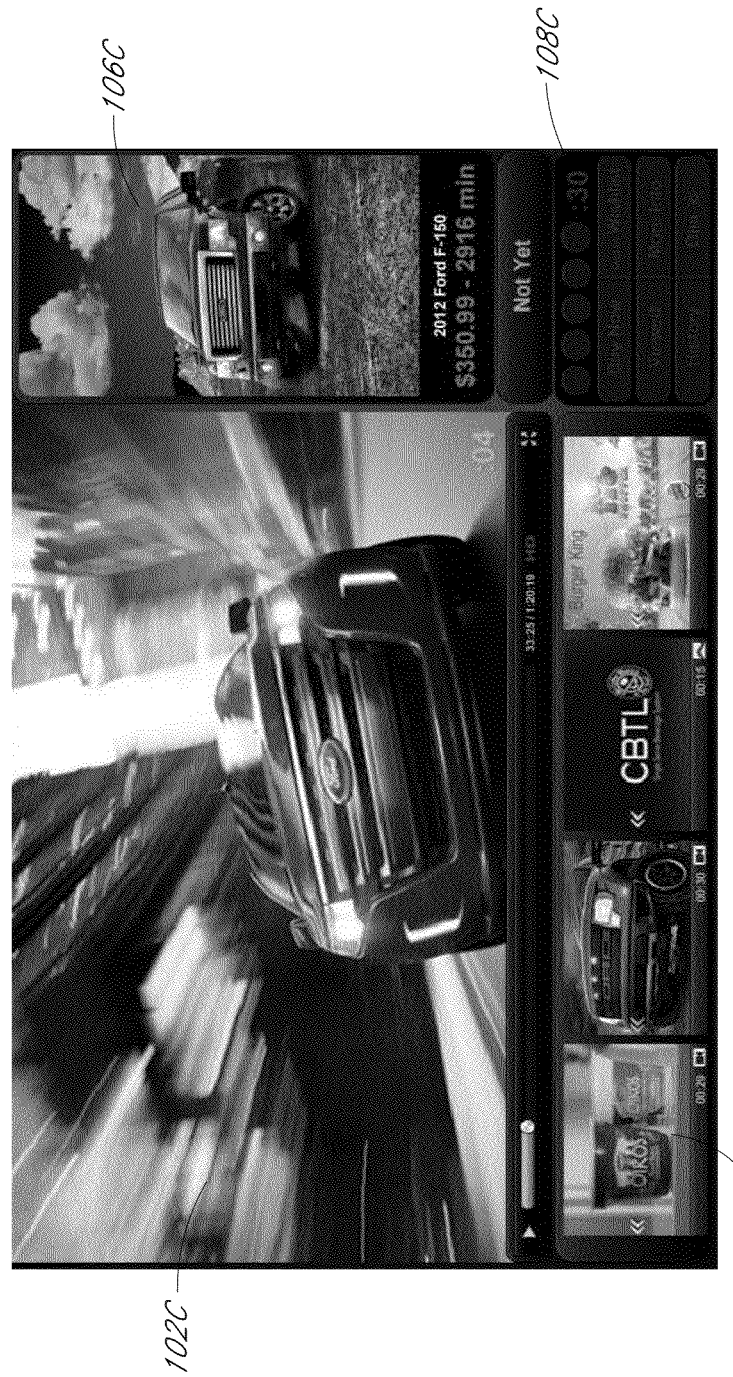
Figure 1D:
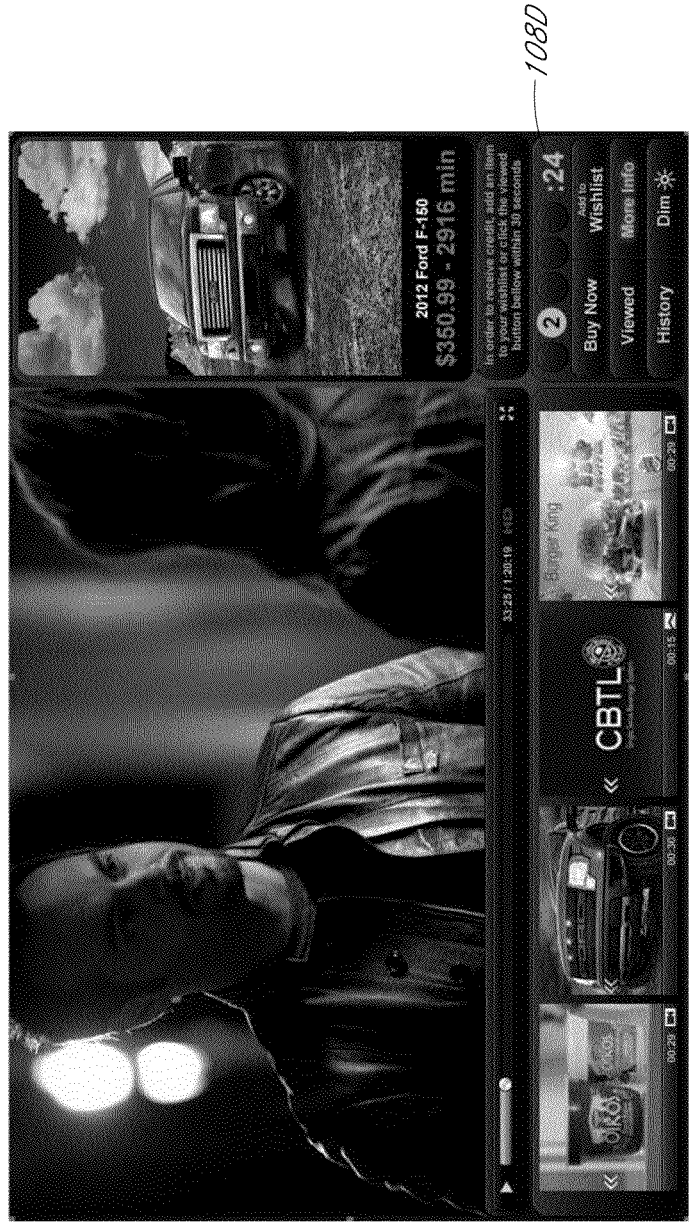
Figure 1E:
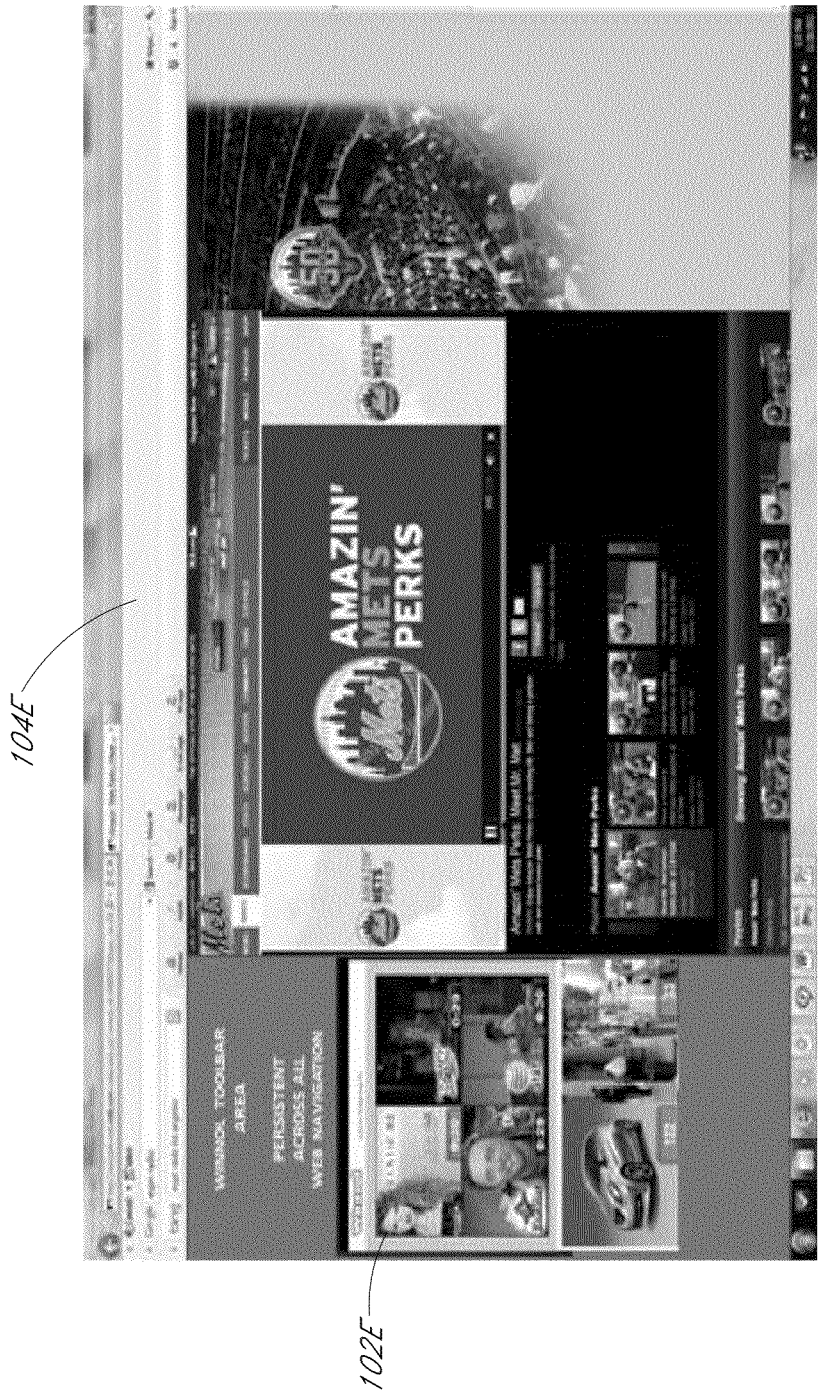
Figure 1F:
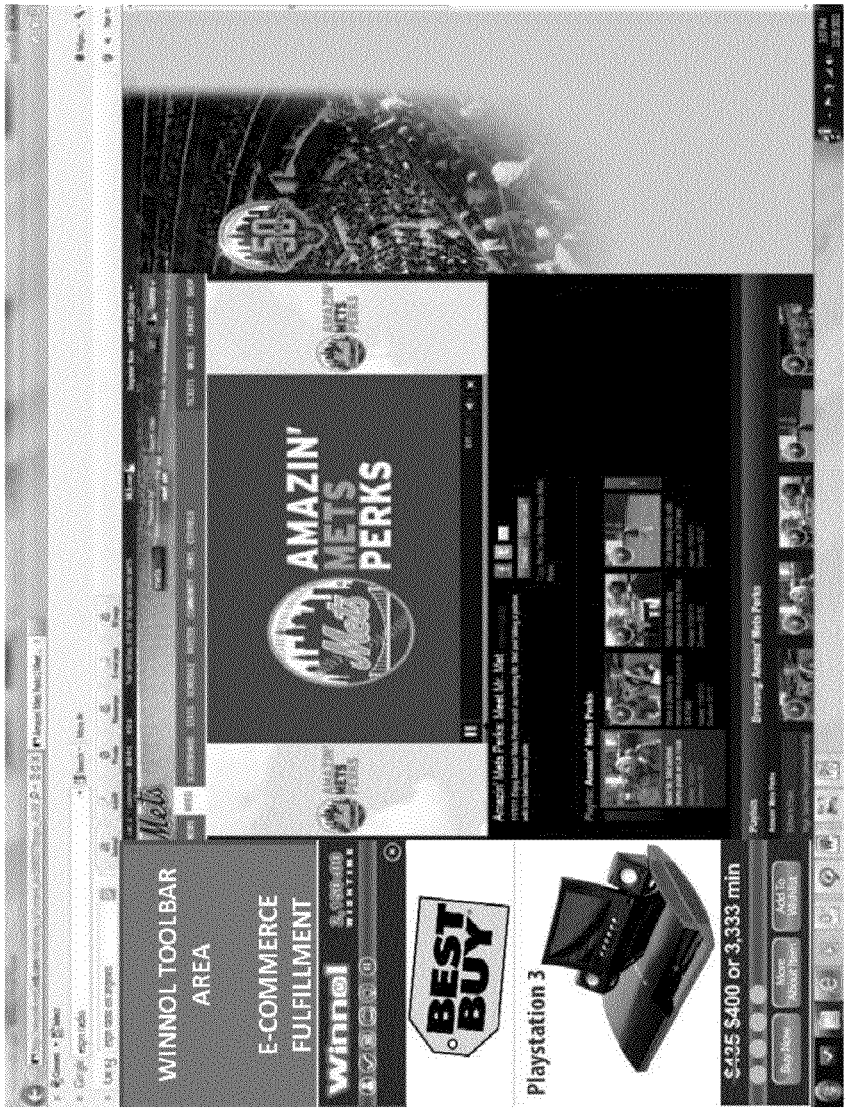
Figure 1G:
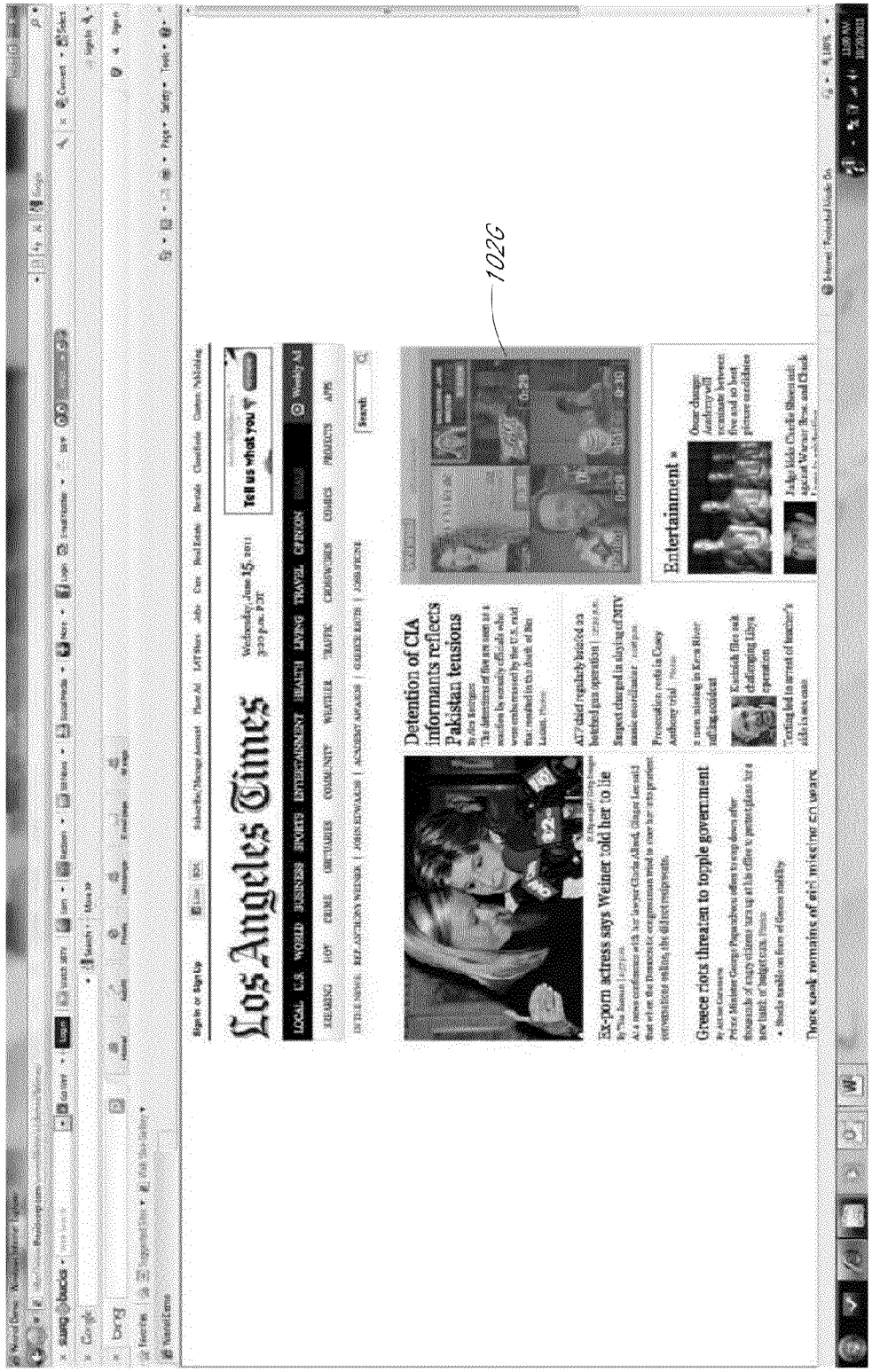
Figure 1G:
Figure 1G:
Figure 1G:
Figure 1G:
Figure 1G:

A sponsored content area 102G illustrated in FIG. 1G may be provided that includes one or more items of sponsored content (which may include video content, still image content, textual content, animated content, etc.). In this example, representations of four items of sponsored content are presented, with a time length for each item displayed as an overlay on a given item. Fewer or additional items may be displayed. In this example, the representations of the items of sponsored content include still images from the items of content, with relevant text and/or logo overlaid thereon. If a user selects one of the items of sponsored content, it will begin playing and/or the content may be expanded in size. For example, when an item of sponsored content is select or is being played, the system or client software may cause the item content to be expanded in size to occupy a larger portion of the window in which the home page is displayed. By way of illustration, the playing item of sponsored content may be sized to occupy one quarter, one half, or substantially all of the display/window, optionally leaving room to display a visual menu listing additional items of sponsored content from which the user may select. As discussed elsewhere, some or all of the items of sponsored content may be selected based at least in part on the user's profile and/or on criteria specified by a respective sponsor. The sponsored content area 102G is illustrated in an enlarged version in FIG. 1Ga.

The sponsored content area 102G may be embedded on one or more web pages of a third party site and/or of a site hosted by the content distribution system. As illustrated in FIG. 1Gb, a login user interface may be provided via the sponsored content area 102G, enabling the user to login in to the user's account with the content distribution system. The login user interface may replace/overlay an item of sponsored content, and after the user logs in, the login user interface may be replaced with an item of sponsored content. The user can click on an item of content displayed in the sponsored content area and the selected content is played, as illustrated in FIG. 1Gc. Optionally, the selected content is expanded to occupy substantially all of the sponsored content area 102G, or substantially the entire window or screen. The sponsored content area, even when provided via a third party site, may also display the amount of credits the user has earned (e.g., retrieved from the content distribution system), and provide a control via which the user can redeem earned credits or add items to the user's wish list, as illustrated in FIG. 1Ge. The redeem/wish list controls may replace/overlay an item of sponsored content, and after the adds an item to the wish list, the redeem/wish list user interface may be replaced with an item of sponsored content.

Optionally, prior to the selected advertisement being fully played, the viewed control displayed but "grayed" out to indicate that the viewed control cannot yet be activated (see, e.g., FIG. 1C, controls 108C). Then, substantially immediately after the selected advertisement has been played (e.g., the advertisement illustrated in FIG. 1C 102C), the "viewed" control 108D is presented or enabled, as illustrated in FIG. 1D and a countdown timer is displayed. In this example, the user needs to activate the "viewed" control before the countdown timer times out in order to be entitled to and awarded the earned credits for viewing the advertisements. If the user does not activate the "viewed" control within the time limit specified by the countdown timer, the user is not awarded the credits associated with viewing the advertisement and the advertiser is not charged for the viewing.

Optionally, a history of advertisements viewed by the user, as well as the advertisements themselves, may be made maintained by the system. A user may be provided access to the history via a user interface, which may be presented in the form of still images form the respective advertisements. The user may then select one or more of the advertisements for a repeated viewing. Optionally, a control may be provided in association with a given advertisement via which the user can access a user interface for purchasing an item being promoted by the advertisements and/or a similar item. Thus, if a user views an advertisement, and some time later would like to purchase the advertised item, the user can access the user's viewing history, and select the corresponding advertisement, the system will offer the advertised item for purchase, and the user may acquire (with legal tender and/or earned credits) the corresponding advertised item for purchase.

In certain embodiments, the user may log directly into the system website or via another website, such as a social network website (such as Facebook®, Twitter®, Google+®, MySpace®, etc.). The system may construct a dynamic, customized home page for the user when the user visits and logs into the website hosted by the system. The home page presented to the user may be based, at least in part, or user profile and/or usage history. For example, a customer menu (which may be a text menu and/or a presentation of thumbnails or icons of different items of content) of primary content (content that is primarily non-advertisement content, such as movies, television shows, news, etc., although such primary content may include, for example a product placement, such as a character in a movie driving a car whose manufacturer paid to have included in a scene) may be generated by the system based on the user's expressed preferences, actions, or characteristics, which are matched with content metadata to locate appropriate content.

Optionally, targeted, minor websites may be provided which have a look-and-feel and functionality similar to or identical the "main" website, but with different and appropriate selected content. For example, the site may be targeted to users under 13 years old, with appropriately rated content (e.g., no content having a more mature rating than a PG rating).

By way of illustration, if the user has previously indicated that the user likes comedy television shows (expressly or by viewing a significant amount of comedy television shows), icons or still images corresponding to one or more selected comedy shows may be provided for display to the user device. The sponsored content icons or still images may be presented in the form of a quadrant, such as that illustrated in FIG. 1G, although fewer or additional items of content may be presented (see, e.g., FIG. 1E, sponsored content area 102E, where six content icons or still images may be displayed as a hexagon). The content icons or screen captures may be manually or automatically changed periodically (e.g., every 15 seconds, 30 second, or other time period). The user may select from the menu which content is to be played, and the selected content is then played.

Similarly, if the user had indicated an interest in specified celebrities, the system may locate photographs of the celebrities, which may be displayed to the user. As discussed above, the user may click on one of the celebrities' photographs (or other link identifying or related to the celebrity) and the user may be navigated to an official or fan website of the celebrity (which may be a virtual or sub-website hosted by or operated by the content distribution system, with content provided by another system (e.g., the actual celebrity's site). Advantageously, the navigated-to site may monetize the user's visit (e.g., by presenting advertisements or selling products to the user), which may be shared with the content distribution system operator and/or the celebrity. Optionally, the user may earn credits for visiting the real or virtual celebrity site and for making purchases at the celebrity site or at a sub-shopping site (offering celebrity-specific products, such as clothing (with images of the celebrity and/or branded with the celebrity's name), posters of the celebrity, audio and/or video performances by the celebrity (e.g., in the form of CDs, DVDs, digital downloads), etc.), hosted by/operated by the content distribution system.

Optionally, a content provider and celebrity sub-site may be provided via the content distribution system, wherein content and products for sale may be imported for display to users. The video player can display video and image content stored at third party sites or may import and store such content in a designated content distribution network. For celebrity (and/or content sites) shopping may be hosted and performed by the content distribution system, and the system may offer for purchase celebrity-specific products, such as clothing (with images of the celebrity and/or branded with the celebrity's name), posters of the celebrity, audio and/or video performances by the celebrity (e.g., in the form of CDs, DVDs, digital downloads), etc.).

A similar process may be performed for other targets of interest to the user (e.g., academic institutions, sports teams, political parties, religious organizations). Thus, the content distribution system enables owners of other websites to monetize users' utilization of the technology for earning credit for viewing content.

Additionally, a menu of sponsored content (e.g., advertisements) may be selected by the system based on a combination of some or all of: the user's preferences, characteristics, actions, and advertiser specified demographics for a given campaign or specific advertisement. The advertisements may be presented in the form of a quadrant displayed on the right hand side or left hand side of the page (e.g., centered vertically, even when the user scrolls through the page), although fewer or additional advertisements may be presented, and the advertisements may be presented at different locations (e.g., at the top or bottom of the page). The advertisements displayed in the menu may change periodically (e.g., every 15 seconds, every 30 seconds, or other time frame).

When the user views primary content and/or sponsored content, the user's profile maintained by the system may be updated accordingly.

An advertiser may also setup an advertiser profile. For example, the advertiser may enter the company name, contact information, and specify the category of products/services they offer. Advertisers may upload video and non-video (e.g., photographs, graphics, text) advertisements. In addition, advertisers may add tags relevant to their advertisements (e.g., specifying the ad subject, such as "cars", "clothing", "travel", etc.) and specify the demographics of desired viewers.

Figure 2:
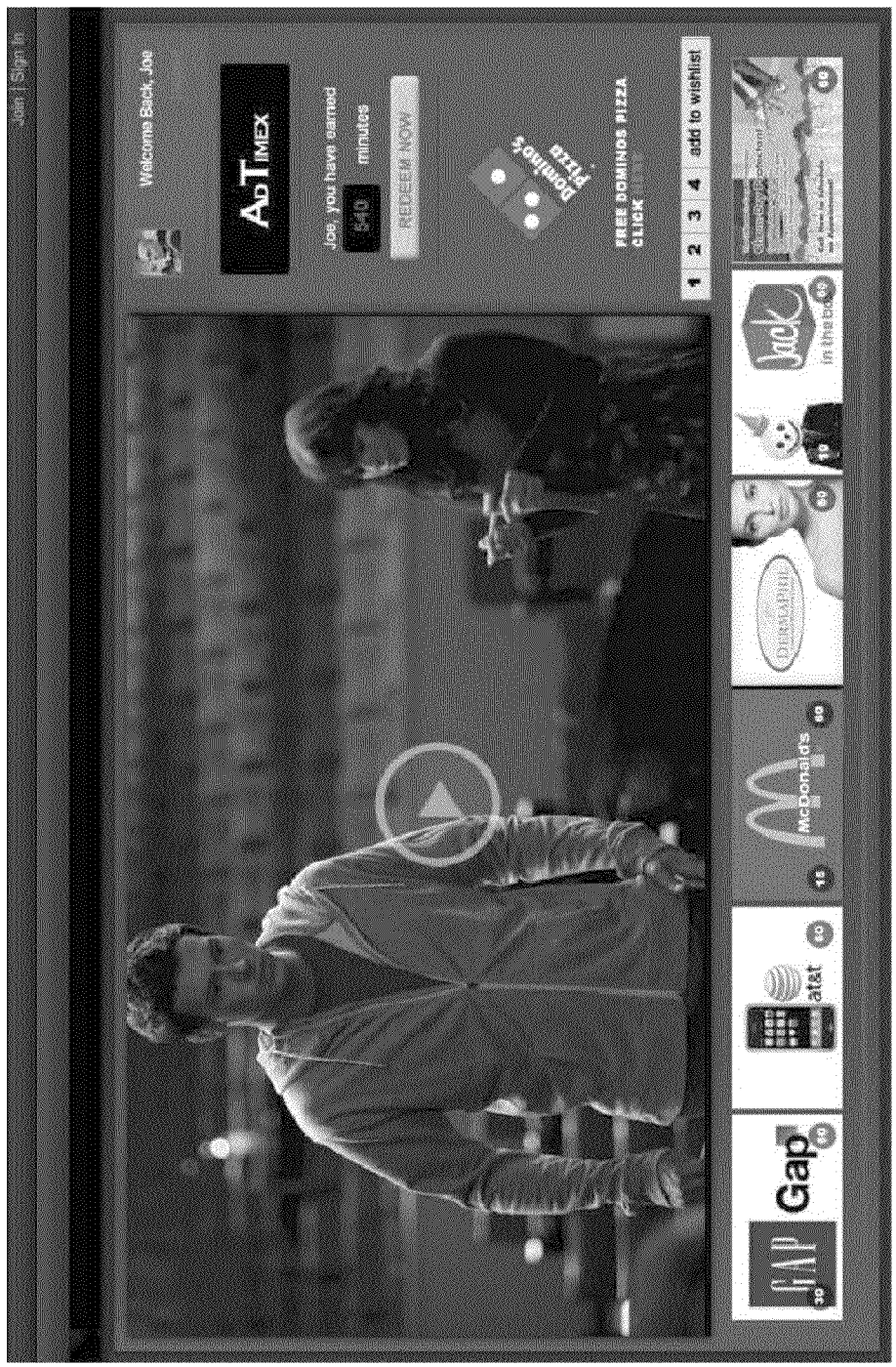

FIG. 2 illustrates another sample browsing experience provided by the content distribution system. FIG. 2 is a depiction of that portion of the website page that represents the content distribution system framework, and may be contained as part of the larger browser window that is providing additional content, such as the home page illustrated in FIG. 1A.

Figure 1H:
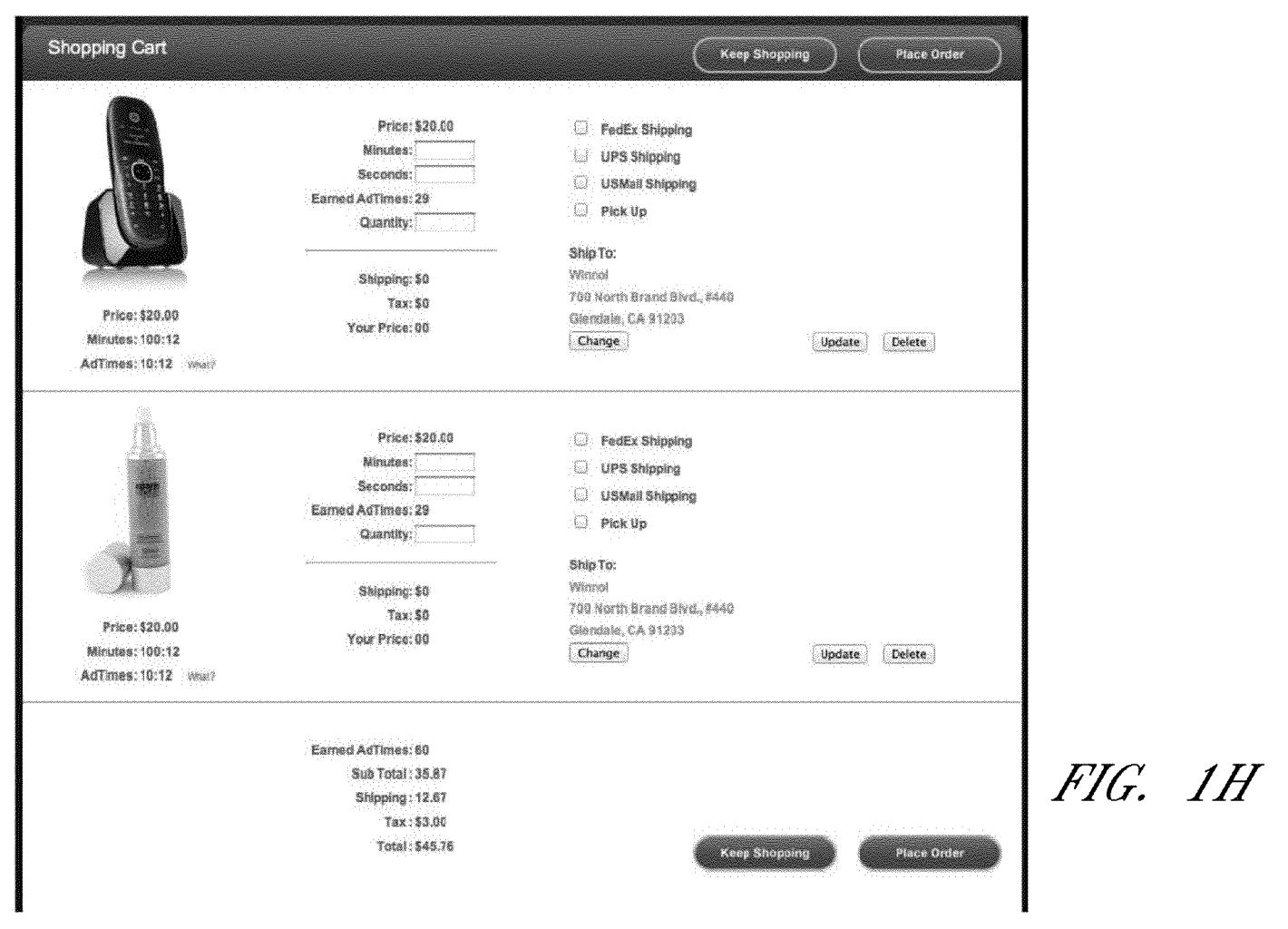

FIG. 1H illustrates an example user interface for purchasing items. This example user interface includes an optional "free" control. If the item is available for free (where "free" in this instance, means without having to spend legal tender or earned credits to obtain the item), the user may activate a free control to acquire the item for free. Optionally, the content distribution system operator may pay for the item being acquired by the user for free. The price may also be listed in terms of earned credit minutes and in legal tender. The user can enter into a "minutes" field how many earned credit minutes the user wants to utilize to purchase the item. If the number of earned credit minutes is not sufficient to obtain the item, the system will calculate and report to the user how much legal tender the user needs to submit in conjunction with the credit minutes to purchase the item. Similarly, the user can enter a legal tender amount into a corresponding field, and if the legal tender amount is insufficient to purchase the item, the system will calculate and report how many credit minutes the user needs to contribute in order to complete the purchase. Once the user has entered a sufficient combination of the credit minutes and legal tender, the user may activate the checkout control to complete the checkout and to acquire the item.

Figure 3:
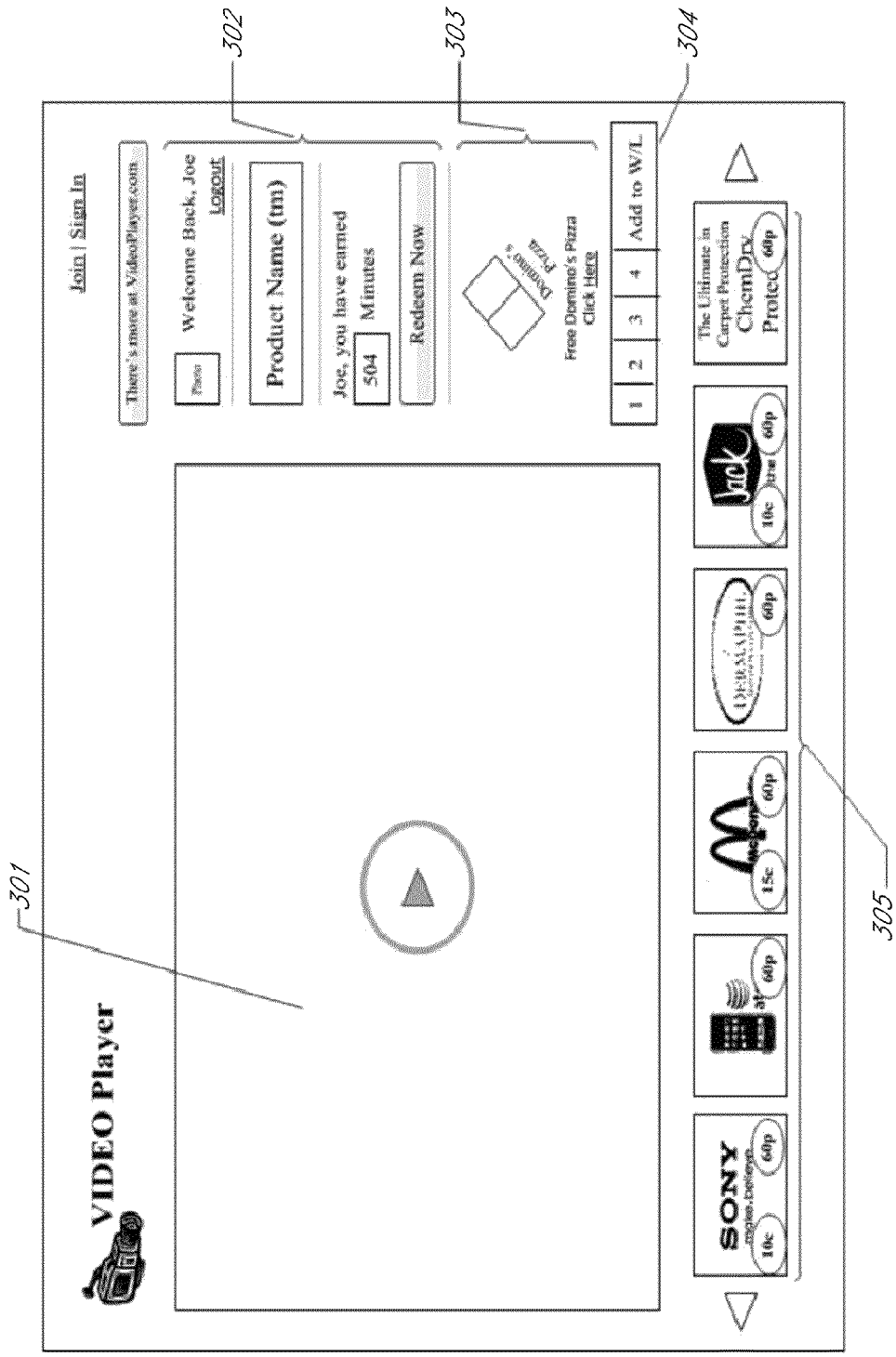

FIG. 3 is a reproduction of the screenshot in FIG. 2 with annotations. In FIG. 3, main media player 301 may stream the video images. A given website might use, by way of example and not limitation, Windows Media Player, QuickTime, HTML5, or any other media player integrated into the site. As shown in FIG. 3, once a viewer is logged into the content distribution system, multiple context sensitive, targeted advertisements in smaller windows 305 may be displayed under the larger main media player 301. Smaller windows 305 containing the advertisements may scroll automatically substantially immediately or after a pre-configured time interval, and/or optionally, the viewer can manually scroll backwards or forwards to either the previous or next advertisements by pressing the arrow keys depicted on either side of smaller windows 305. The length of the advertisements and/or the amount of credit to be earned may be displayed in conjunction with the advertisements.

From the list of smaller windows 305 in FIG. 3, viewers can choose to view a company or product commercial for a short duration of time or to view a company's product list for a longer duration of time by depressing the appropriate minute icons contained within the advertisement image. Once a viewer has selected to view the product list, a viewer has the option to scroll through a list of the company's products that are relevant to the selected advertisement. The product list will be displayed for a longer, specified number of seconds, and the viewer has the option to simply scroll through the list of products, to select to purchase one by redeeming minutes, paying cash, or a combination of both, and also to add products directly to the viewer's wish list. The short commercial view and the longer product list view are shown in more detail in FIG. 4 and FIG. 5.

As discussed above, viewers are awarded redeemable time credits, which may be in the form of bankable minutes, by the system in exchange for viewing the commercial or company product list. Viewers who choose to view the longer product list advertisements may be awarded a larger number of minutes/credits than those viewers who choose to view shorter commercial versions of the same advertisements. The more minutes of viewing performed by the user, the more redeemable credits the user may earn. However, in certain instances, viewing certain advertisement will earn the viewer more credits on a per time period basis than other minutes. For example, a first advertiser may want to provide an increased incentive to view its advertisements, and so may subsidize twice as many credits per viewing minute as a second advertiser. As previously discussed, these accumulated credits are then redeemable for products or services, or special offers such as discounts or upgrades for such products or services.

Users of the content distribution system are able to redeem their accumulated minutes or time credits at partner stores (online and traditional brick and mortar stores) and at participating fulfillment centers. Redemption rights of specific viewers may be validated by sending viewers an encoded electronic barcode to viewer's emails and/or image enabled cellular telephones, and the resulting barcode can then be scanned at the partner store or fulfillment center for substantially instant validation and product or service fulfillment.

Optionally, in order to authenticate the user, the system may generate a receipt for the purchased item and include the user's picture on the receipt (e.g., using a photograph uploaded by the user during the receipt process or previously uploaded by the user and stored in the user's profile). The receipt may further include an order number and a barcode encoding the order number and/or authentication information. The user may then print out the receipt and/or display the receipt on the user's mobile device (e.g., a mobile phone) and provide/display the receipt to a customer service person at the pickup location. The customer service person may then verify that the user is authorized to pick up the item by comparing the picture on the receipt with that of the bearer and/or by scanning the barcode (which may be verified against barcode information stored in the content distribution system database) to determine that the receipt is a valid. Once authentication has been performed, the service person may then provide the user with the item.

Referring to FIG. 3, once viewers are logged in, a viewer's personal profile information 302 may be displayed. Near the top of personal profile information 302 a viewer's personal photo or chosen representation thereof (avatar) and a personalized welcome back message with the viewer's name may optionally be displayed. Below the greeting message will be prominently displayed an eventual chosen product name for the content distribution system may be prominently displayed. Near the bottom of personal profile information 302 is a summary of the viewer's currently banked minutes or time credits as well as a button that can be pressed to initiate the minute redemption process.

In FIG. 3, a special offer 303 from a specific advertiser who is participating in the credit-based viewing service may be displayed. This special offer is for a free or discounted item from an advertiser, and viewers can click on the offer to answer one or more questions and receive the free or discounted item. These questions may include responding to a few survey questions posed by the advertiser, or the agreement to opt in and provide personal information such as an email address to receive correspondence on future opportunities and special offers. In certain embodiments there is no correlation between the currently displayed special offer 303 and the scrolling small window advertisements 305 in FIG. 3. Advertisers have the option to have their advertisement appear as a special offer 303 in the side bar or as a viewable advertisement 305, or both.

Figure 5:
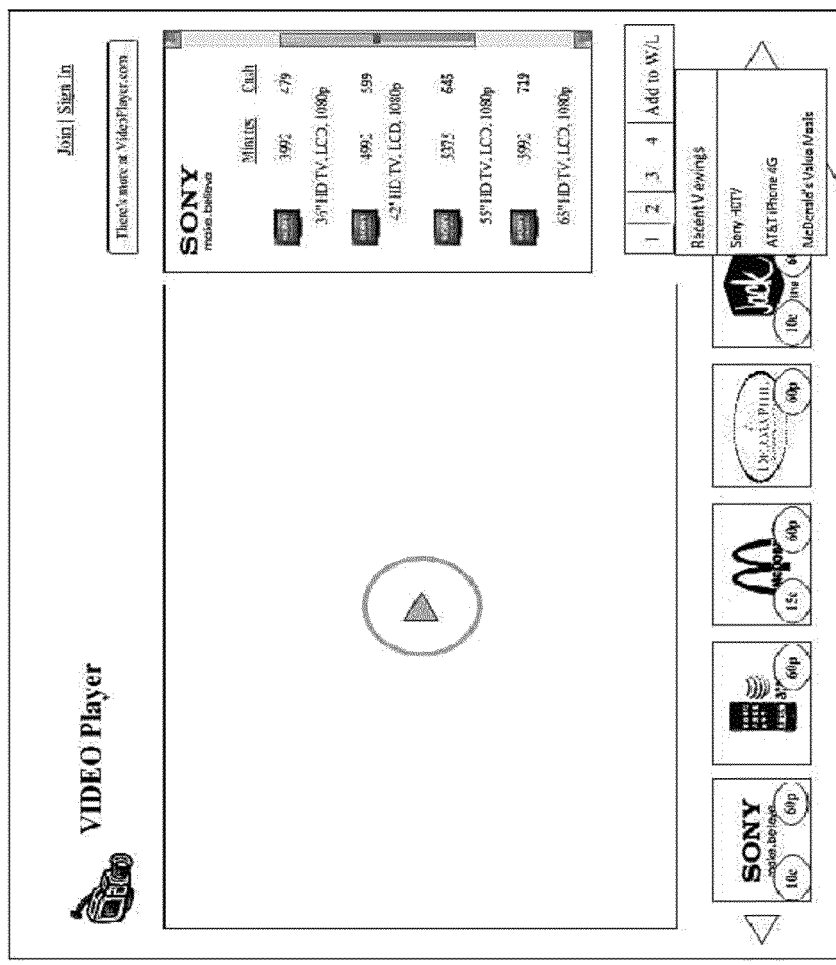

Referring to FIG. 3, an optional history tray 304 of the number of recently earned minutes/credits and activity is displayed. As viewers accumulate redeemable minutes or time credits, the history tray will move to the right to depict accumulating minutes and will store a historical accounting of all advertisements viewed. Viewers can see their viewing history by hovering a cursor/pointer over the history tray. When the viewer hovers the cursor over the minute number it shows the history of viewed advertisements and commercials so that the viewer can revisit the previously viewed advertisements or commercials 502, as shown in FIG. 5. Optionally, the user's viewing history may be stored and/or accessible only for the current session, or the user's viewing history may be stored and accessible for multiple sessions.

In order to select a previously viewed advertisement the viewer can select an item from the drop-down list and optionally add a product of choice to the wish list. In certain embodiments, no time is earned during this additional period of activity, as the viewer can only get credited one time for viewing an advertisement. However, optionally, the user may be able to earn credits for watching an advertisement repeatedly. When the recently accumulated redeemable minutes reaches a preset limit (in this example, 5 minutes), viewers are optionally required to add an item to their wish list before being able to accumulate more minutes. Optionally, a cap may be provided on how many credits a user may earn in a specified time period. For example, a user may be restricted from earning more than 1000 credit minutes in a month (even if the user watches more than 1000 minutes of advertising during the month). Optionally, as discussed in greater detail below, the user may be enabled to earn more than cap if the user takes certain actions. For example, if the user makes certain purchases, the user may have the cap raised to a higher amount (e.g., 2000 credit minutes in a month). Other example actions that may optionally be specified include adding an item to a wish list, transferring an item from a wish list to a shopping cart, inviting another person to be become a user of the system (e.g., by provided contact information of the invitee to the system, which may then transmit an invitation to the person), etc.

Optionally, the user may only be entitled to earn a maximum number of credits per day, up to a specified maximum number of credits per month (or other time period). For example, if the user has a maximum cap of 1000 credit minutes per month, the user may only be allowed to earn 33 credit minutes per day for watching eligible sponsored content. However, optionally, if the user earned less than 33 credit minutes in a given day (because the user did not watch sufficient sponsored content that day to earn 33 credit minutes), the user may be able to "catch-up" by watching additional advertisements on future days in the month. For example, if the user did not earn any credit minutes one day, the user may be allowed to earn 66 credit minutes the next day. Thus, on a given day, the user may be allowed to earn:

> (specified maximum credits per month/number of days in the month)+(the cumulative number of earned credits the user was entitled to earn that month up to the current day–the cumulative number of earned credits the user actually earned that month up to the current day)

However, optionally, the user is prevented from getting ahead of the cumulative daily total cap. For example, in the example above, on the first day of the month, the user may be prevented from earning more than 33 credit minutes.

A given user's wish list depicts the user's desired products, services, or discounts and special offers that the viewer would like to consider redeeming their points towards. However, even in those embodiments where the user is required to add an item to their wish list, the user may not be required to redeem any minutes at this time. Optionally, there will be no limit as to the number of minutes/credits that any viewer can earn before redemption of such minutes/credits. However, optionally, a user may be required to expend a certain amount of credits within a certain period of time after being earned, or the credits will be deleted or expire (e.g., within 12 months or other time period). In certain embodiments, when a user is ready to add an item to the user's wish list, the user presses the "W/L" (wish list) button which is part of history tray 304.

When a logged in viewer chooses to view a shorter product or company commercial, the commercial may be shown in the main player window 301 illustrated in FIG. 3. The selection may be made by the viewer by pressing on a small oval icon on the left side of one of the smaller advertisements 305 depicted in FIG. 3. The advertiser may or may not choose to offer a shorter viewing option for the specific advertisement.

When a logged in viewer chooses to view a product list from the company, the selection may be made by the viewer by pressing on a small oval button on the right side of one of the smaller advertisements 305 depicted in FIG. 3. The product list may be then shown in the side bar to the right of the main player window in FIG. 3. The area of the screen depicted in personal profile information 302 and special offer 303 may be replaced by the product list from the company sponsoring the advertisement. The product list may be closely associated with the specific product line or product type that was displayed in the small window advertisement. An example of the content distribution system with the product list being displayed is shown in FIG. 5. As is the case for the shorter commercial, an advertiser may or may not choose to offer a product list option for the specific advertisement.

Figure 4:
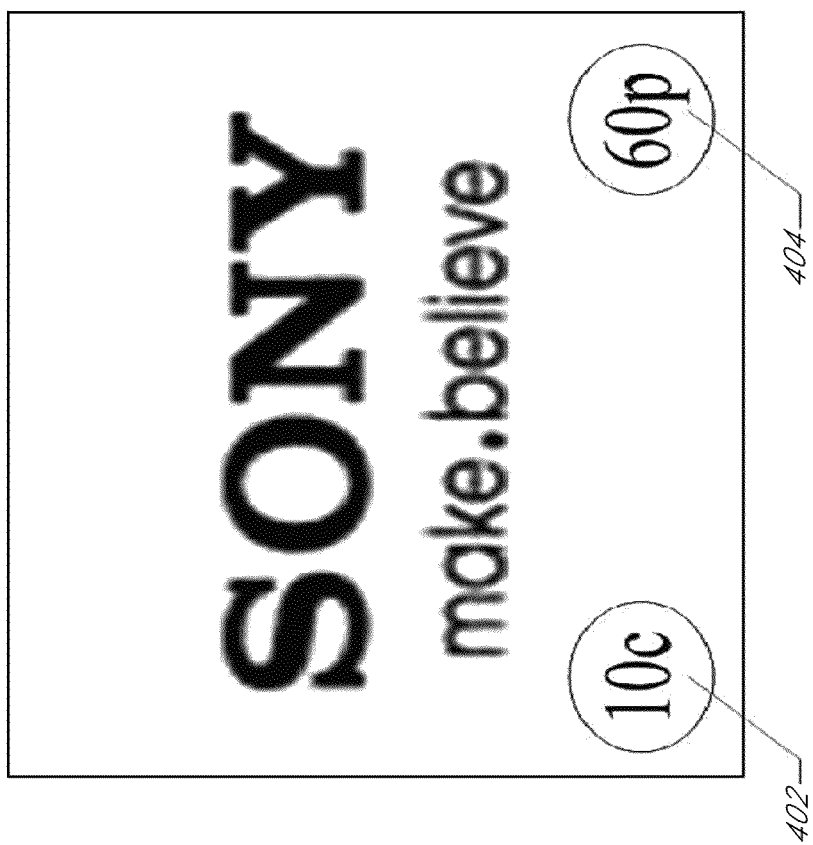

FIG. 4 illustrates a detailed example of a smaller window 305 advertisement that would be scrolling and appear in one of the windows of FIG. 3. In FIG. 4, a left oval button 402 may be pressed to view a short company commercial in the main player window. Oval buttons that can be pressed to access shorter commercials contain a smaller number representing a shorter time period that the commercial will be viewed for along with a the letter "c" after the numbers representing the fact that a viewer will be viewing a commercial. The shorter number represents the number of seconds that the commercial will be shown for, and viewing the commercial in its entirety will credit the viewer's banked redeemable minutes or time credits with the identical number of seconds. In this example, left oval button 402 illustrates a button containing "10c" which signifies that the commercial will play in the main player window for 10 seconds, and the fact that selecting the button will display a commercial as opposed to a product list. Upon viewing the commercial for 10 seconds, the viewer will be credited with 10 redeemable seconds or time credits.

With respect to the user interface illustrated in FIG. 4, a right oval button 404 may be pressed to view a product shopping list in the side bar. The oval button in this example is displayed on the right side of the main player window. Oval buttons that can be pressed to access product lists contain a larger number representing a longer time period that the list must be viewed to earn redeemable minutes or time credits, followed by the letter "p" representing the fact that a viewer will be viewing a product list. The larger number represents the number of seconds that the product list will be shown for, and viewing the product list for that duration will credit the viewer's banked redeemable minutes or time credits with the identical number of seconds. In this example, right oval button 404 illustrates a button containing "60p" which signifies that the product list will be displayed in the sidebar area for 60 seconds, and the fact that selecting the button will display a product list as opposed to a commercial. Upon viewing the product list for 60 seconds, the viewer will be credited with 60 redeemable seconds of time credits, or 1 minute.

The content distribution system also has an associated login webpage which may be made available for all registered users. Using this website, users are able to update comprehensive personal profile and preference and interest information to allow targeted demographic advertisement delivery, as similarly discussed above.

Thus, there is a multitude of ways that a viewer can be awarded redeemable minutes or time credits from advertisers. Numerous advertisers can be recruited in large quantities around the world to participate in the system. Numerous websites can also be recruited in large quantities around the world to participate in the system. Advertising slots in small window 305 of FIG. 3 may optionally also be reserved for smaller, local advertisers participating in a geographically limited area. Thus, advertisers are provided with great flexibility in the manner in which their ads are displayed. Via the content distribution system, advertisers can offer up their advertisements in video or static form, they can scale the minutes or time credits they award based on the scope of the viewer's involvement, they can focus on narrow geography or widespread geography for advertisement display, and they can data mine user profiles to target demographically significant viewing audiences.

Figure 6:
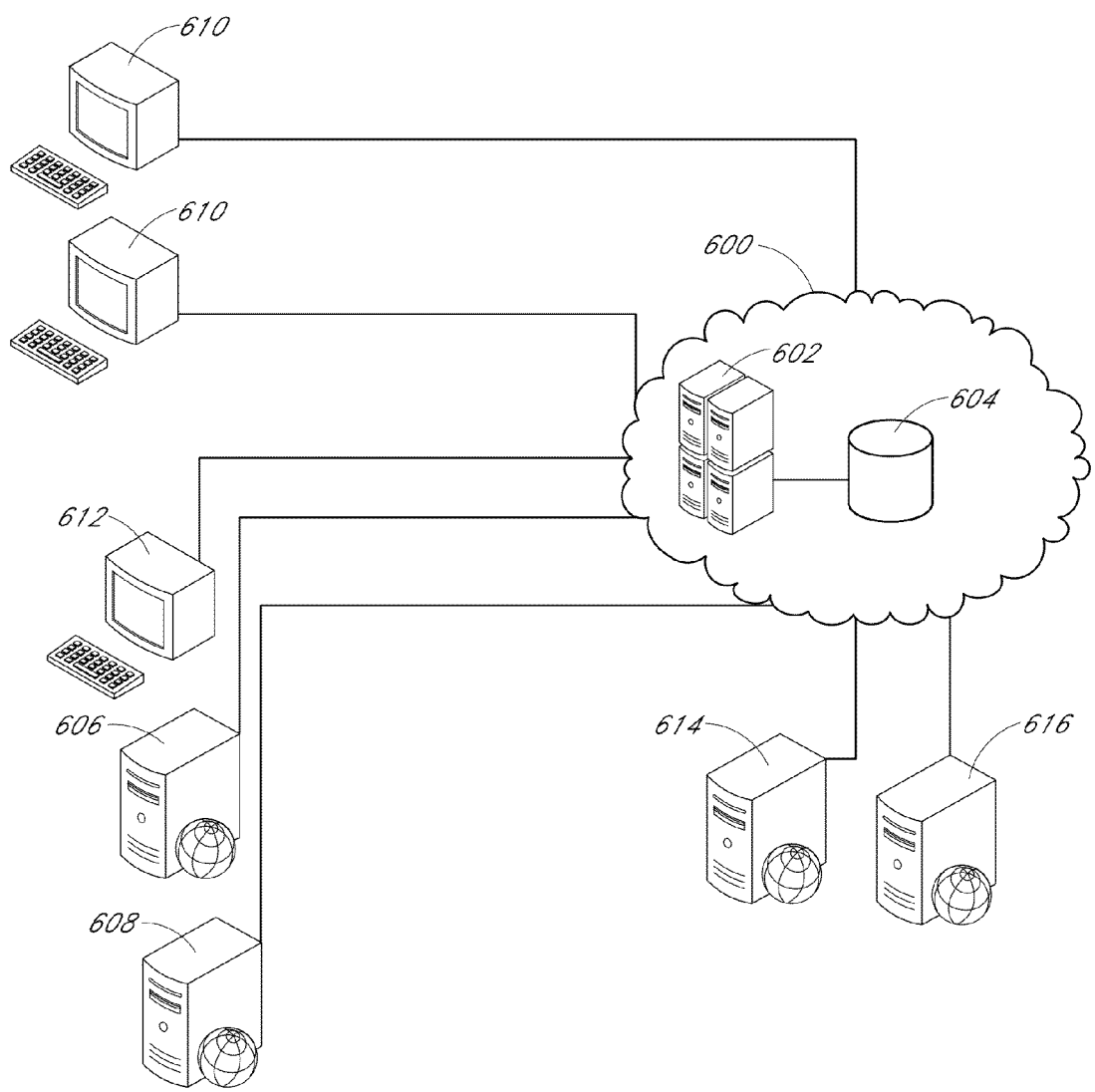
FIG. 6 illustrates an example system architecture.

FIG. 6 illustrates an example system architecture. A content distribution system 600 (which may be cloud based) includes a server 602 (which may include one or more geographically distributed servers) including a database 604, which may be in the form of a relational database. The database (which may be hosted on one or more servers) may store user account information, user profiles, advertiser campaign and target demographic information, primary video content, advertising content, thumbnails/screenshots of primary and advertisement content, surveys and quizzes. For example, the surveys or quizzes may be presented to a viewer during or after the playing of the advertisement, wherein the viewer needs to answer in order to demonstrate to the system that the user is actually watching the advertisement in order to earn viewing credits (where if the system determines that the user did not answer, or did not answer a sufficient number of questions correctly, the system does not assign credit for the viewing). A given item of stored content may be associated with metadata. For example, the metadata may include object identifiers (OID), and tags describing the subject matter of the content, an associated advertiser, etc.

The system information flow may depend on user usage and whether a website visited by a user is or is not a partner with the content distribution operator. For a partner, a widget and/or a web solution may be utilized to provide the user interfaces and certain functionality described herein. For example, some or all of the logic and intelligence for displaying advertisements and video content may be performed using a custom web application for a given partner. The widget or web application may be provided to the partner by the content distribution system operator or other entity. Optionally, for non-partners, a toolbar (such as the toolbar described elsewhere herein) may be utilized to provide the advertisements to the user. Optionally, the same toolbar implementation may be utilized for large numbers or all users.

The content distribution system 600 may be coupled via a network (e.g., the Internet) to the one or more third party content provider systems 606, 608 hosting content such as online television shows or movies. In addition, the system 600 may be coupled to one or more advertiser content provider systems 614, 616 to request and receive advertisement content served by the advertiser content provider systems 614, 616. The system 600 may be accessed by user devices 610, 612, which may be in the form of computer systems, mobile smart phones, interactive television sets/set top boxes, etc. The system 600 may transmit the user interfaces and content to the users devices 610, 612 as similarly described above.

The system 600 may be accessed wirelessly, via wired broadband connection, or via a public switched telephone network, by way of example.

Figure 10:
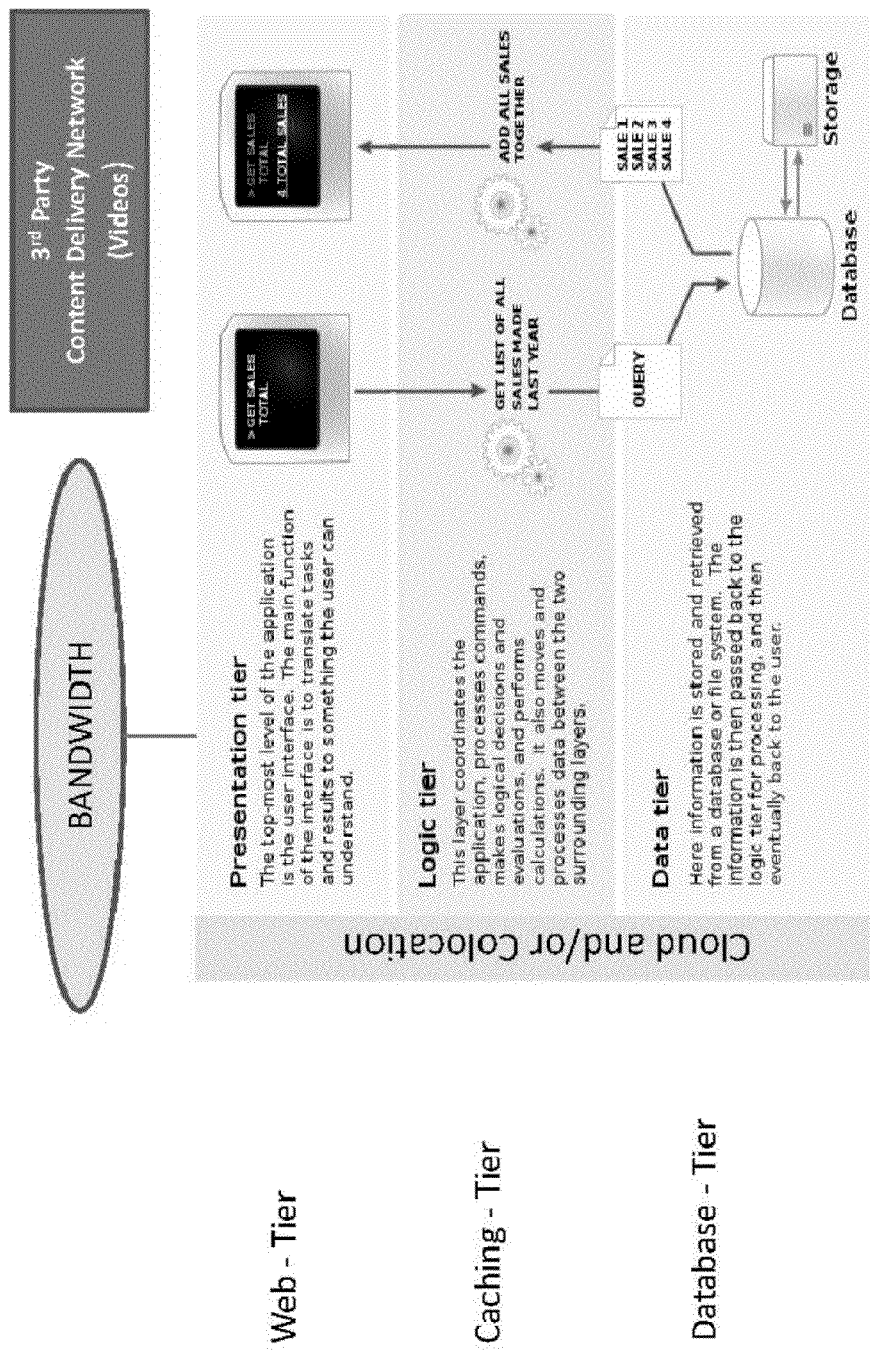
FIG. 10 illustrates an example data flow.

FIG. 10 illustrates an example tiered architecture, content delivery network (CDN) and data flow. In this example, there is a data tier, a logic tier, and a presentation tier. The presentation tier is the top-most layer of the architecture. The presentation layer presents user interfaces to the user via the user terminal. The presentation layer translates task and results for presentation to the user. The logic layer coordinates the processes described herein, processes commands, makes logical decisions, and performs calculations, such as those described elsewhere herein. The logic layer further routes, processes, and caches data communicating by the presentation and data tier. The data tier stores data to and retrieves data from one or more databases/file systems. Thus, for example, data retrieved from the data tier is passed to the logic tier for processing, and the processed data is in turn passed by the logic tier to the presentation tier for presentation to the user. The CDN may replicate the video to geographically distributed data centers (e.g., distributed around the world). Then, based on user location and network available bandwidth, the CDN may stream the video from one of the data centers with minimal or no video hiccups and with a reliable and consistent quality of video delivery service. Thus, the system may be implemented using a cloud, collocation, and/or CDN architecture.

Thus, for example, if the user requests, via a user interface presented on a browser, information regarding the user's past purchases or advertisement viewing history, the request is passed from the presentation layer to the logic layer. The logic layer formulates a corresponding query, and passes the query to the data tier. The corresponding purchase data is retrieved from the database and passed to the logic tier. The logic tier accumulates the purchase amounts and passes the total to the presentation layer for display to the user.

Figure 7:
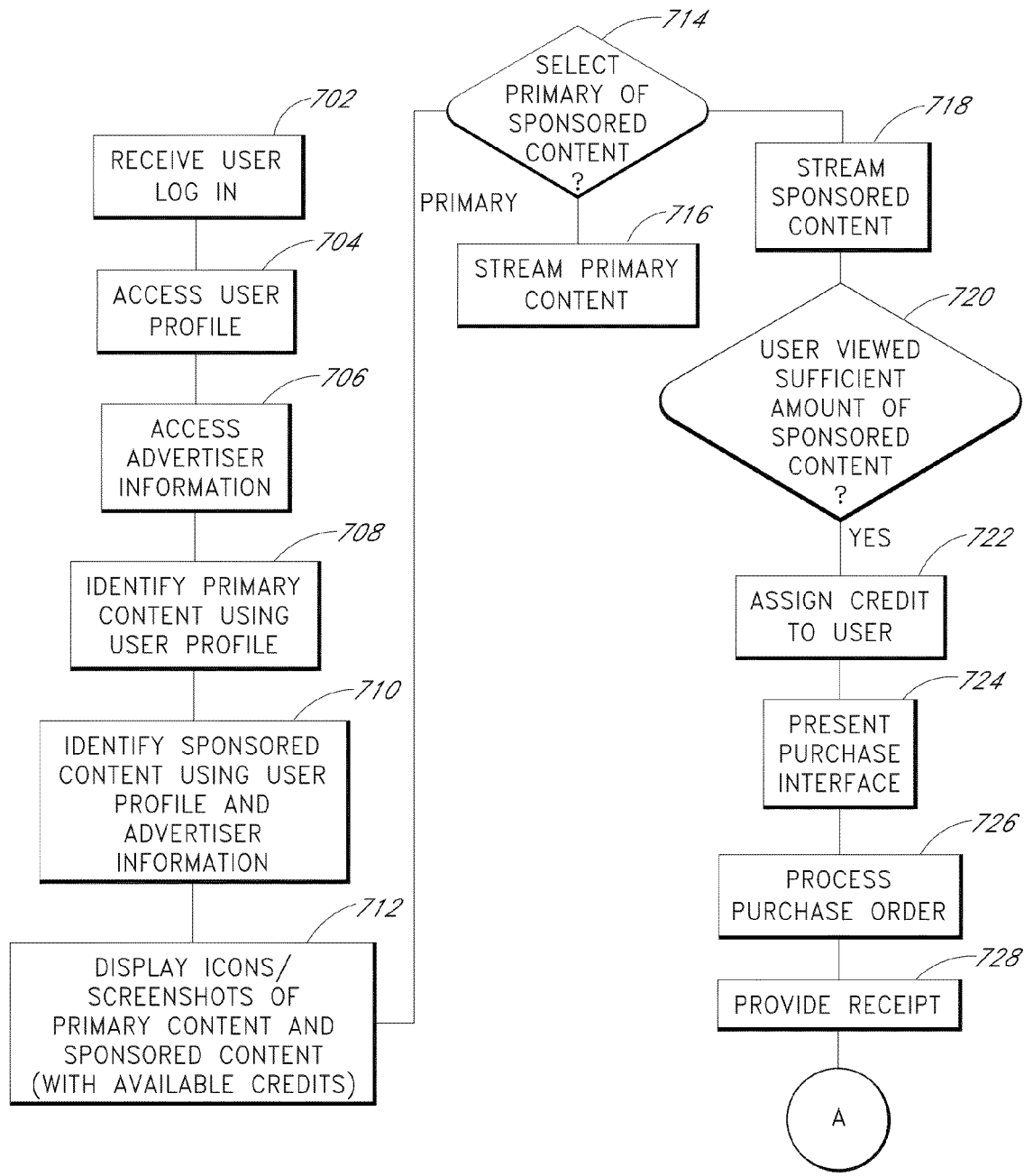
FIGS. 7, 7A illustrate an example process for selecting and delivering content to a user.
Figure 7A:
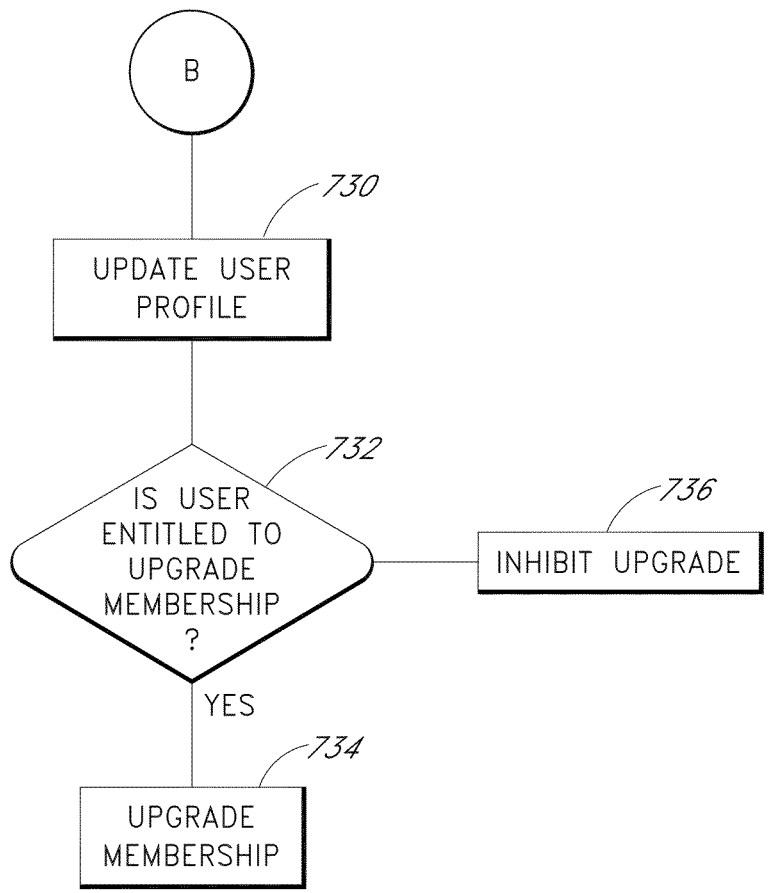

FIGS. 7, 7A illustrate an example content selection and presentation process. At state 702, a user logs into the content distribution system via an access device (e.g., a personal computer, mobile phone, etc.), wherein the user's user identifier and password is manually or automatically provided to the system (as discussed elsewhere herein, the user may optionally instead login via a third party site, such as a social networking site). At state 704, the content distribution system accesses profile data for the user, using the user's login information and/or information obtained from a cookie or other file stored on the user's device. At state 706, the system accesses advertiser information, including information on active campaigns, budget information, and desired demographics. At state 708, the system utilizes the user's profile information to identify one or more available items of primary content that the user would likely want to view. For example, the system may identify the four items of content (or other number of items of content) that most closely match the user's interests as indicated by the user's profile, and that the user has not previously viewed using the system.

At state 710, the system utilizes the user's profile information and the advertiser information to identify one or more active ads (or other forms of sponsored content) targeted to the user. For example, the system may identify active advertisements (where the sponsor indicates an end date or an expenditure that may be used to determine with an active advertisement becomes inactive) whose targeted demographics match or substantially match the demographics of the user and/or that match or substantially match the user's interests as determined from the user's profile.

At state 712, the system provides for display on the user's device text/icons/screenshots of one or more of the identified items of primary content (e.g., four items of primary content) and icons/screenshots of one or more of the identified advertisements (e.g., four or six items of advertisements). The system accesses a time length and/or qualification viewing time, and a viewing credit associated with each of the identified advertisements and displays the time length and viewing credit in conjunction with the corresponding advertisement icon/screenshot. While other numbers of items of content may be displayed (e.g., one item, eight items, twelve items, etc.), the display of four-six items of content (rather than less than four items or more than six items) more likely ensures that at least one item of content will be of interest to the user, while not overwhelming the user or presenting items of less interest to the user, as might occur if more than four-six items were presented.

Optionally, the system may cause a first set of items of primary content and a first set of advertisements to be initially displayed, and then, if the user does not make a selection of an item of primary content or advertisement within a specified period of time (e.g., within 15 seconds), cause a second set of primary content or a second set of advertisement content to be displayed, and so on.

At state 714 the system determines if the user has selected an advertisement or an item of primary content to be displayed.

If the user selected an item of primary content, the process proceeds to state 716, and the selected item of primary content is streamed to the user device for playback.

If the user selected an item of advertisement, the process proceeds to state 718, and the selected advertisement is streamed to the user device for playback. Optionally, if the user was viewing a primary content video while selecting the advertisement, the playing of the primary video is automatically paused. At state 720, a determination is made as to whether the user has viewed the entirety of the ad (or other specified minimum amount of the ad). If the user has viewed the entirety of the ad (or other specified minimum amount of the ad), then at state 722, the user is assigned the corresponding credit (e.g., by storing and/or accumulating the credit amount in the user's account information). Otherwise, the user is not assigned the corresponding content. Optionally, if the primary content video is paused, playback is automatically re-initiated after playback of the advertisement is completed.

At state 724, a purchase user interface may be presented whereby the user can purchase one or more products/services depicted or discussed in the advertisement and/or one or more other items. The user interface can indicate the cost of the item in terms of credits earned from viewing advertisements, a currency amount (e.g., in dollars/cents), and/or one or more combinations of earned credits and currency. The item(s) presented to the user may optionally be selected based in part on the user's profile and/or target purchaser characteristics specified by the advertiser or a retailer selling the item(s). Any discounts or rebates that the user may be entitled to (e.g., as a result of the user's membership level or by simply being a registered using the content distribution system) may be identified and applied by the system to the purchase.

In certain instances, one or more items may be offered for free to the user (wherein the user does not need to use redeemable credits or legal tender to purchase the items), optionally on a pseudo random or random basis. Optionally, the user is offered one or more free items based in whole or in part on the amount of advertisements (e.g., measured in time and/or quantity) the user has viewed within a given period (e.g., that day, the current week, the current month, the last 7 days, the last 30 days, etc.). Thus, the system may operate a first timer or other accumulator that tracks the number of minutes or times a user has watched eligible sponsored advertising in order to determine how many redeemable credits the user is to be assigned, and a second timer or other accumulator that that tracks the number of minutes a user has watched eligible sponsored advertising in order to determine what free items to offer the user. Optionally, the second timer or other accumulator tracking the number of minutes a user has watched eligible sponsored advertising in order to determine what free items to offer the user is reset each time a user has purchased an item and/or periodically (e.g., each month or every 30 days) in order to encourage the user to select a free item periodically (where the user is notified periodically of the reset policy). Optionally, rather than reset the "free" timer each time a free item is selected by the user, the "free" timer is decremented an amount corresponding to the free item selected, wherein the selection of certain free items (e.g., relatively more valuable free items), may cause the "free" timer than the selection of other free items (e.g., relatively more valuable free items).

The free products or services may be purchased by the content distribution system operator using a portion of the fees received from advertisers/content sponsors. Thus, in an example embodiment, the user benefits by earning free products and services, and by earning redeemable credits which may be applied to the purchase of products and services. The content sponsors may benefit in that their advertisements are presented to users that actually view the advertisements, and by having their products purchased by the system operator (optionally using a portion of the revenue received from the advertisers/content sponsors), and provided to users that may be interested in purchasing their products in the future. The system operator benefits in that it may retain as profit a portion of the fees paid by the advertisers/sponsors. Optionally, certain or all of the credits earned by users may only be redeemed via the system and/or its partners, and/or for items offered by the system or its partners.

The user can select one or more items to purchase. If the user is making a purchase using earned credits, a determination may be made as to whether the user has sufficient earned credits to make the purchase. If the user does not have sufficient earned credits to make the purchase, the user may be informed as to how much earned credit the user has, the difference between the amount of earned credit the user has and the amount of earned credit needed, and an amount in currency the user will need to pay to make up the difference (which may be calculated by the system). Optionally, the user may be offered the option to purchase additional credits at a specified price.

For certain items, the user interface may indicate that the item may be shipped to the user and/or may be picked up by the user. In certain instances the user may be provided with a control via which the user can instruct the system to arrange to have the item available for pickup. At state 726, purchase requests made by the user are processed by the content distribution system or another system, and the user is charged (in credits and/or currency) for the item(s) and the item(s) are provided to the user (or to another person designated by the user).

If the user instructed the system to arrange for the purchased item to be picked up at a retailer or other location, then at state 728, the system generates a receipt to be printed and provided by the user or displayed by the user (e.g., via a mobile phone or computer) at the pickup location. As discussed elsewhere herein, the receipt may include the user's image on the receipt (e.g., using a photograph uploaded by the user during the receipt process or previously uploaded by the user and stored in the user's profile). The receipt may further include an order number and a barcode encoding the order number and/or authentication information.

At state 730, the user's profile is updated by the system to reflect the purchase. This updated profile may be used to better target advertisements and products to the user. Any credits used to pay for the purchase are deducted from the user's account. At state 732, a determination is made as to whether the purchase entitles the user to an upgraded membership/title (which may have increased benefits as described elsewhere herein). If the user is entitled to an upgraded membership/title, then at state 734, a corresponding indication is stored in the user's account/profile information, and a notification is transmitted to the user (e.g., via email, SMS, MMS, a web page, etc.) regarding the upgrade and the associated benefits. If the user is not entitled to an upgrade, at state 736, the upgrade is inhibited.

Optionally, the rewards for viewing content (e.g., advertisements or other sponsored content) may be tiered. For example, the rewards may increase at certain threshold(s) (e.g., in linear or non-linear proportion to the amount/time duration of advertisements viewed). Thus, for example, the incremental reward provided to the user for watching a second hour of advertisements may be greater than the reward provided for the first hour of watching advertisements. The rewards may also be tiered based on the amount of total purchases made by the user overall or over a certain period of time (e.g., per month, the last month, over the last year, etc.).

In addition, when the user achieves certain thresholds of viewing time, earned credits, and/or purchases, the user may be awarded certain titles and/or membership levels (e.g., "Top Viewer", "Top 1000 Earner", "Silver", "Gold", "Platinum", "Black Gold", etc.) by the system, and such titles/membership levels may be provided for display to other users of the system and/or the titles may be posted on one or more external social networking web pages. The system may generate messages to the user (e.g., via email, instant messaging service, SMS, MMS, or otherwise) regarding the user's prizes, points, purchases, membership levels, etc.

Optionally, certain benefits may be provided to a user based at least in part on the thresholds reached or membership levels. Optionally, the user may be offered certain products or services for free. The value/desirability of the free product and/or service being offered may optionally increase in proportion (in linear or non-linear proportion) with the user's earned time, credits, purchases, title, and/or membership levels. Products or services may be provided randomly to users (e.g., to some but not all users viewing or having just viewed an advertisement) to provide an incentive to the users to stay online and/or view targeted content/advertisements. The membership of a given user may be automatically determined by the system based on one or more of the foregoing factors (e.g., the user's purchases, earned time/credits, etc.) and recorded in an account record of the user.

By way of illustration and not limitation, where the membership levels are based on purchases, a user may be assigned to the lowest level if the user has made less than a first threshold dollar amount of purchases in a first period of time (e.g., the previous month, week, day, or year). The threshold can optionally be set as low as the lowest currency value (e.g., a penny), so that if the user made any purchases, the purchase would enable the user to exceed the first threshold. At the lowest membership level, the user may be entitled to a first maximum dollar value (or quantity) of free product/services (where the term "free" in this instance indicates that the user does not have to apply money or earned redeemable credits to obtain the product or service). In addition, the user may be entitled to earn a first maximum amount of credits for viewing advertisements within the first time period. Thus, even if the user views more than enough advertisements within the first period of time to earn more than the first maximum amount of credits, the user will not be assigned more than the first maximum amount of credits.

The user may be assigned to a second, higher membership level if the user has made more than the first threshold dollar amount of purchases in the first period of time and less than a second threshold dollar amount (if there are still higher membership levels). As a benefit of being assigned to the second membership level, the cap on the amount of credits that may be earned within the first period may be raised to a second maximum amount. In addition, the user may be entitled to earn a second maximum dollar value (or quantity) of free product/services (the second maximum dollar or quantity value higher than the first). Further, the types of free items from which the user may select may include items of a different type (e.g., more preferred) than that offered to users at the first membership level. For example, users at the first membership level may be offered free fast food, drinks, promotional items, while users at the second membership level may be able to select from the same items offered to users at the first membership level, but in addition, may be offered free movie tickets, downloadable songs and movies, meals at upscale restaurants and membership to online content provider services (e.g., streaming media services).

The user may be assigned to a third, still higher membership level if the user has made more than the second threshold dollar amount of purchases in the first period of time and less than a third threshold dollar amount (if there are still higher membership levels). As a benefit of being assigned to the third membership level, the cap on the amount of credits that may be earned within the first period may be raised to a third maximum amount. In addition, the user may be entitled to earn a third maximum dollar value (or quantity) of free product/services (the third maximum dollar or quantity value higher than the second). In addition, the types of free items from which the user may select may include items of a different type (e.g., more preferred) than that offered to users at the first and second membership level (although the user may be able to select from items offered to users at the first and second membership levels). In addition, the user may be allowed to purchase, via the system, credits. Thus, for example, the user may be offered 7 redeemable credit minutes (the equivalent of watching 7 minutes of advertising) for $1.00, where the user does not have to actually watch the 7 minutes of advertising to earn the 7 credits. In addition, the user may be awarded, without charge, a certain amount of credit minutes (e.g., the equivalent of watching 500 minutes of advertising) where the user does not have to actually watch the corresponding minutes of advertising to earn the awarded credits.

Of course, there could be addition or fewer levels of membership and the benefits may differ from those provided in the examples herein.

Optionally, even if a user purchases an item via the system utilizing the user's own money (e.g., without using viewing credits to make the purchase), the user may be granted a discount or refund. Optionally, the discount or refund may increase in proportion (in linear or non-linear proportion) with the user's earned time, credits, title and/or membership levels.

Tiered benefits for viewing content and making purchase will now be described with reference to FIG. 8. As discussed above, user rewards may be tiered based on the amount of total purchases overall or over a certain period of time. In certain embodiments, purchases made using earned credits are optionally not counted in the purchase total. FIG. 8 illustrates an example tier structure. In this example, users that have made no cash purchases over a specified time period (e.g., the last month), but only purchased items using earned credits (or have not made any purchases at all) may be assigned to a silver level. The user may only be allowed to earn up to 1000 credit minutes/month. Thus, if a credit minute has a cash equivalent of 12 cents, the user may earn up to the cash equivalent of $120 (1000×$0.12). The user may be entitled to a first set of free benefits (e.g., free fast food, drinks, promotional items, etc.). Users that have spent above a first threshold (e.g., $500) in making cash purchases over a specified time period (e.g., the last month) may be assigned to a gold level. The user may be allowed to earn up to 2500 credit minutes/month. Thus, if a credit minute has a cash equivalent of 12 cents, the user may earn up to the cash equivalent of $300 (2500×$0.12). The user may be entitled to a second, enhanced set of free benefits (e.g., free fast food, drinks, movie tickets, download songs, download movies, promotional items, etc.). Users that have spent above a second threshold (e.g., $1000) in making cash purchases over a specified time period (e.g., the last month) may be assigned to a platinum level. The user may be allowed to earn up to 5000 credit minutes/month. In addition, in this example, the user is awarded 500 credit minutes without having to watch corresponding videos. Thus, if a credit minute has a cash equivalent of 12 cents, the user may earn up to the cash equivalent of $660 ((5000×$0.12)+(500×$0.12)). The user may be entitled to a third, further enhanced set of free benefits (e.g., free fast food, drinks, gourmet restaurants, vacations, airline tickets, hotel stays, concert tickets, back passes, sporting events, movie tickets, download songs, download movies, promotional items, etc.). Users that have spent above a third threshold (e.g., $10,000) in making cash purchases over a specified time period (e.g., the last month) may be assigned to a black gold level. The user may be allowed to earn up to 10,000 credit minutes/month. In addition, in this example, the user is awarded 1000 credit minutes without having to watch corresponding videos. Thus, if a credit minute has a cash equivalent of 12 cents, the user may earn up to the cash equivalent of $1320 ((10000×$0.12)+(1000×$0.12)). The user may also be entitled to a fourth, enhanced set of free benefits (e.g., all of the benefits of the platinum level, plus addition benefits, such as VIP status, celebrity dinners, first class tickets, worldwide travel, etc.).

As similarly discussed above, in addition to the incentives of earning redeemable minutes or time credits, there are a number of additional factors available to advertisers which encourage viewers to watch advertisements to completion, and to deter the use of automatic 'bot' programs that attempt to circumvent the infrastructure and attempt to earn redeemable minutes dishonestly. These additional factors include the ability for advertisers to request that viewers respond to survey questions upon completion of viewing, the factor that incomplete viewings will not advance the scroll bar portion of history tray 304 of FIG. 3 in order to add items to the wish list, and the availability of a timeout mechanism that may log viewers out of the system upon expiration of a predetermined timeout if viewers remain logged in without viewing any minute or time credit enabled advertisements. Optionally, instead of, or in addition to the survey questions, a user may be instructed to click a control within a certain time period of viewing an advertisement in order to demonstrate that the advertisement was viewed. For example, after completion of the advertisement, a countdown timer may be displayed to the user indicating how much time the user has to click the appropriate control (which may optionally be emphasized via flashing or otherwise).

Advantageously, certain embodiments of the content distribution system benefit users by refining the demographic targeting of advertisements, thereby providing users with more relevant advertising. Not only can user entered preferences and profiles provide a basis for targeted advertisement delivery, but each completed viewing over time establishes a viewing pattern for the viewer, which in turn provides additional refinement in the targeting formulas available to the advertiser. Thus, the content delivery system learns and over time improves its ability to deliver accurate demographics to the advertiser.

Another advantageous attribute of certain embodiments of the content distribution system are the analytics or heuristic conclusions that can be derived from viewer profiles and viewing patterns. As the viewing membership multiplies, and as more data is aggregated concerning viewer advertisement selection, viewing habits, and website selection, predictive analytics can be derived from the membership data that serves to even further refine demographic targeting of advertisements.

Figure 9B:
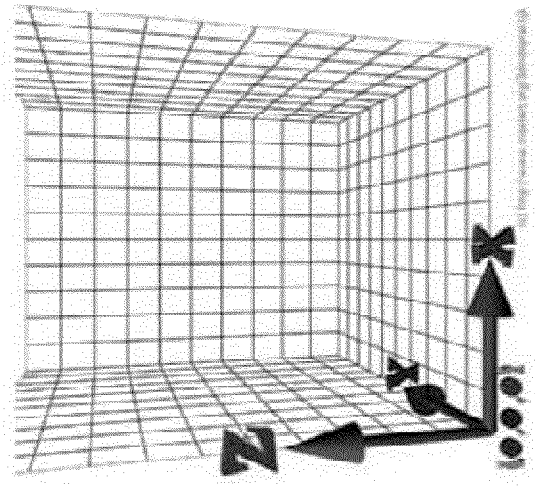

Optionally, a multi-dimensional technique may be provided for specifying users that are to be targeted with a given ad campaign or products. For example, as illustrated in FIG. 9A, an advertiser (or an operator entering data on behalf of the advertiser) may be presented with a multi-dimension matrix (e.g., a two dimension matrix). In this example, the x axis represents categories, and the y matrix represents demographics. A user or content information axis may be provided as well as illustrated in FIG. 9B. In addition, a time axis may be provided, where an advertiser may certain times/events/shows at which a given advertisement is to be displayed. Thus, for example, a two, three, or four dimensional matrix may be used to specify how advertisements are to be targeted.

For example, the demographics can include ages or age ranges, birth date, gender, sexual orientation, locations (e.g., by zip code, city name, radius around a zip code area, etc.), marital status (e.g., single, married, divorced, cohabitating), professions (e.g., doctor, IT specialist, service provider, attorney, accountant, construction worker, etc.), income level (e.g., under $20K, $20K-60K, $60K-120K, $120K-250K, above $250K, etc), education level (e.g., high school, GED, college, graduate school) ethnicity, religion, political affiliation (e.g., independent, Democrat, Republication), preferences (e.g., favorite network(s), book type (e.g., non-fiction, science fiction, best sellers, trade paperbacks, humor, etc.,) sports (e.g., MLB, NBA, NFL, NHL), music (e.g., rock, rap, country, adult alternative, alternative, classical)_etc. By way of example, "categories" may relate to types of goods or services (e.g., accessories, clothing, jewelry, movies, music, news, automobiles, travel, health, beauty, auctions, electronics, computers, cameras, cell phones, food, coffee, restaurants, tools, education, sporting events, entertainment, etc.). In this example, for a given category, the advertiser indicates (e.g., via a Y(es) entry), which demographics the advertiser wants to target for a given advertisement, group of advertisements, and/or products (where the products are to be sold via the content distribution system website or an affiliate thereof). Optionally, the matrix may be initially automatically populated with N(o)s, which indicates that the corresponding demographic is not to be targeted with a respective advertisement or product. Optionally, the advertiser may specify a dollar amount for a given advertisement campaign. The system may then process the completed matrix and select and target advertisements and/or products accordingly.

The selections of advertisements for a user can be autonomic. The autonomic self-tuning algorithms adjust to actual user behavior instead of using user stated preferences which conflict or contradict user stated preferences.

In another example embodiments, a user interface may be presented to an advertiser, including a plurality of categories and demographics with associated check boxes (or other selection mechanisms). Some or all of the example demographics and categories discussed elsewhere herein may optionally be included in the user interface. The advertiser may select the desired categories and demographics for which a given advertisement or campaign is to be directed.

In certain embodiments, when a user visits a site, such as a website, of a third party and activates a link to the system provided via a webpage of the third party website (e.g., a site providing online television shows, movies, etc.), the system takes over inserts content onto the webpage (e.g., sponsored content, such as an advertisement in the form of a video, an image, and/or text selected based at least in part on a profile of the user). The sponsored content may be displayed/played via a video player application, installed on the third party webpage using code provided by the content distribution system operator or otherwise. The video player may display/play multiple items of sponsored content in a quadrant or otherwise. The sponsored content may be streamed to the video player from the content distribution system or from another networked site. If a user clicks on an item of sponsored content (e.g., a screen shot, icon, or other representation of the sponsored content), a notification may be transmitted back to the content distribution system, which may cause, at least in part, the selected item of sponsored content to be streamed to the video player hosted on the third party webpage. The content distribution system may interact with the user as similarly discussed elsewhere herein with respect to embodiments where users interact directly with a site operated by the content distribution system. For example, the video player may further display a product offering which the user can purchase using legal tender and/or earned credits, as similarly discussed above. The video player may be customized for a given third party site, to accommodate the functionality, layout and/or look and feel of the third party site.

For example, the advertisement may be presented in conjunction with primary content, such as a television show or movie provided via the third party site. The primary content may be supplied by the third party, and the sponsored content may be provided from another source, such as the content distribution system 600 illustrated in FIG. 6 (e.g., via an MySQL/File System and/or via a content distribution network vendor having geographically distributed servers).

As will be discussed below with respect to FIG. 1B, the primary content may have a "full screen" control, which normally would cause the display of the content to expand to occupy substantially the entire screen of the user's playback device. However, in an example embodiment, if the user activates the full screen control after the system takes control of the webpage using a video player (which may be sourced by the content distribution system operator), the system will enable the content to expand in size, but to a smaller size than the content would have expanded to absent the system taking over the webpage. The expansion permitted by the system leaves sufficient room on the user screen for the selected advertisements to be displayed in conjunction with the third party content. For example, the advertisements may be presented in the form of a quadrant or "six-pack", or in the form of an L-shaped toolbar or an inverse L-shaped tool bar, where advertisements and/or offers may be presented on at least the left or right side of the primary content, as well as beneath and/or over the primary content. Thus, in certain optional embodiments, even when the user activates the full screen mode, advertisements (or thumbnails thereof) are still transmitted to and displayed to the user as similarly discussed above.

FIG. 1B illustrates an example window 100B, where the user activated a "full screen" control with respect to the primary content 102B, and the primary content 102B is expanded to occupy a large part of the displayed window 100B (a majority of the window in this example), while still leaving room for sponsored content 104B (which may be relatively low resolution static images), and optionally, an offer of a product or service (e.g., a free movie ticket in this example) in an offer area 106B.

Optionally, instead, when the user activates the full-screen control, the primary content may be displayed in true full screen mode (occupying the entire screen or window), however, the advertisements and/or offers may be caused to overlay a portion of the primary content, such as in the form of the quadrant or "six-pack", or in the form of an L-shaped toolbar or an inverse L-shaped tool bar, as similarly discussed above. Optionally, the user may activate a "fade" control, which causes the advertisements and/or offers to be displayed at a lower intensity and/or in a translucent manner (where the underlying content is at least partly visible through the overlaying advertisements or offers) over the primary content so as to be less distracting to the user. Optionally, controls are provided via which the user can specify which of the above modes are to be used in displaying advertisements and/or offers on the user's terminal. As similarly discussed above, in some or all of the modes, the advertisements and/or offers may be periodically manually and/or automatically rotated so that new advertisements/offers are presented to the user.

The interface displayed in FIG. 1B may be provided by a video player executed on the user's client computer. The content may be sourced via a web server or a content distribution network and transmitted to the video player using HTTP and/or RTMP delivery protocols. The content distribution system may provide a source address (e.g., an MRL (media source location), which may point to the web server of the content distribution network.

FIG. 1C illustrates the user interface of FIG. 1B after one of the items of sponsored content 104B was selected by the user. The selected sponsored content 102C is displayed in the area where the primary content 102B was displayed in the user interface of FIG. 1B. A countdown timer is displayed showing the time remaining with respect to the playing of the advertisement. Other selections of sponsored content 104B may still be displayed. Area 106C illustrates a first of a plurality of products being offered for purchase. The plurality of products may have been selected based at least in part the sponsored content selected by the user, the user's profile, and/or buyer characteristics specified by the merchant offering the product. Area 106C illustrates a static image related to the video content 102C (e.g., an image of another product from the same manufacturer or retailer), listing the acquisition amount in dollars and earned credit minutes. The buy now, wishlist, viewed, history and dim controls are inactive (as indicated by their faded appearance) until the sponsored video content 102C has completed playing.

FIG. 1D illustrates the product offering 108B shown in FIG. 1C, one the controls are enabled after the sponsored content has displayed. The price for the product is shown in both currency and earned credits. A "buy it now" control is provided, which when activated by the user, causes the displayed product to be either added to the user's shopping cart or to be immediately purchased, depending on the system configuration. A "more about this item" control is provided, which when activated by the user, causes more information regarding the product to be displayed. An "add to wish list" control is provided, which when activated by the user, causes the product to be added to the user's wish list. The wish list may be viewed by other users who may purchase the item as a gift for the user. Controls are displayed which enables the user to cause the user interface to display the other selected products. A time limit number is displayed, wherein if the user activates a "viewed" control within the specified time limit, the user is assigned corresponding earned credits, and if the user does not activate the "viewed" control within the time limit, the user is not assigned corresponding earned credits. A redeem control is provided via which the user can instruct the system to use earned credits to make the purchase. Controls may also be provided that enables the user to pause, rewind, play, or dim sponsored content or the item offering.

FIG. 1E illustrates another embodiment, wherein the user interface includes a toolbar area 102E and a web page viewing area 104E. The toolbar area 102E displays sponsored content similar to the sponsored content display 102G illustrated in FIG. 1G. The toolbar may be downloaded from a remote system by the user's browser and installed on the browser. As the user navigates from web page to web page in viewing area 104E, the sponsored content in the toolbar area 102E persists, and so follows the user as the user navigates from page to page and site to site.

FIG. 1F illustrates the toolbar area 102E displaying an item offering, as similarly discussed above with respect to FIG. 1C. As similarly discussed above with respect to FIG. 1E, the toolbar persists as the user navigates in viewing area 102E from page to page and site to site.

Thus, as similarly discussed above, certain embodiments provide, via a website, phone application, or otherwise, in any language or localization, the ability to deliver time credits advertisement viewing technology to a viewer thus enabling the viewer to accumulate redeemable minutes or time credits related to the time expended for viewers to view the enabled advertisements, commercials, or product lists. Optionally, the viewer can choose the length of time to view or remain engaged in a advertisement, commercial, or product list from a specific advertiser, wherein the longer this length of time, the more redeemable minutes or time credits are accrued by the viewer. Such viewing time or associated credits may be redeemed for products, services, or discounts and/or other special or free offers from advertisers. In certain embodiments, a user (e.g., after the user is logged in), is provided with an option to select commercials, advertisements, and/or product lists from advertisers either while watching other selected content, or upon temporarily pausing such selected content. Optionally, the user is not limited as to the number of minutes or time credits that can be accrued. In certain embodiments, once a user is logged into the content distribution system, the login session persists as the user moves from website to website across the Internet.

Some or all of the content distribution system technology can be placed within a third party content provider's website including but not limited to websites configured to provide media, digital video (live or recorded), text, social media, movie and television network sites, interactive video games, business and personal applications, and numerous other types of content.

Certain embodiments of the content distribution system provide advertisers with demographic and viewer interest data in order to target their advertisements (examples of which are illustrated in FIG. 9A and FIG. 9B). As the system records viewing and purchasing preferences over time, advertisers can refine and focus what is delivered to viewers by employing data mining and predictive analytics techniques against the viewer database as more advertisements, commercials, and product lists are viewed. Thus, delivery platforms and infrastructures are described, embodiments of which enable monetization of the advertisement viewing experience for the viewer, the advertiser, and the content provider.

Figure 11A:
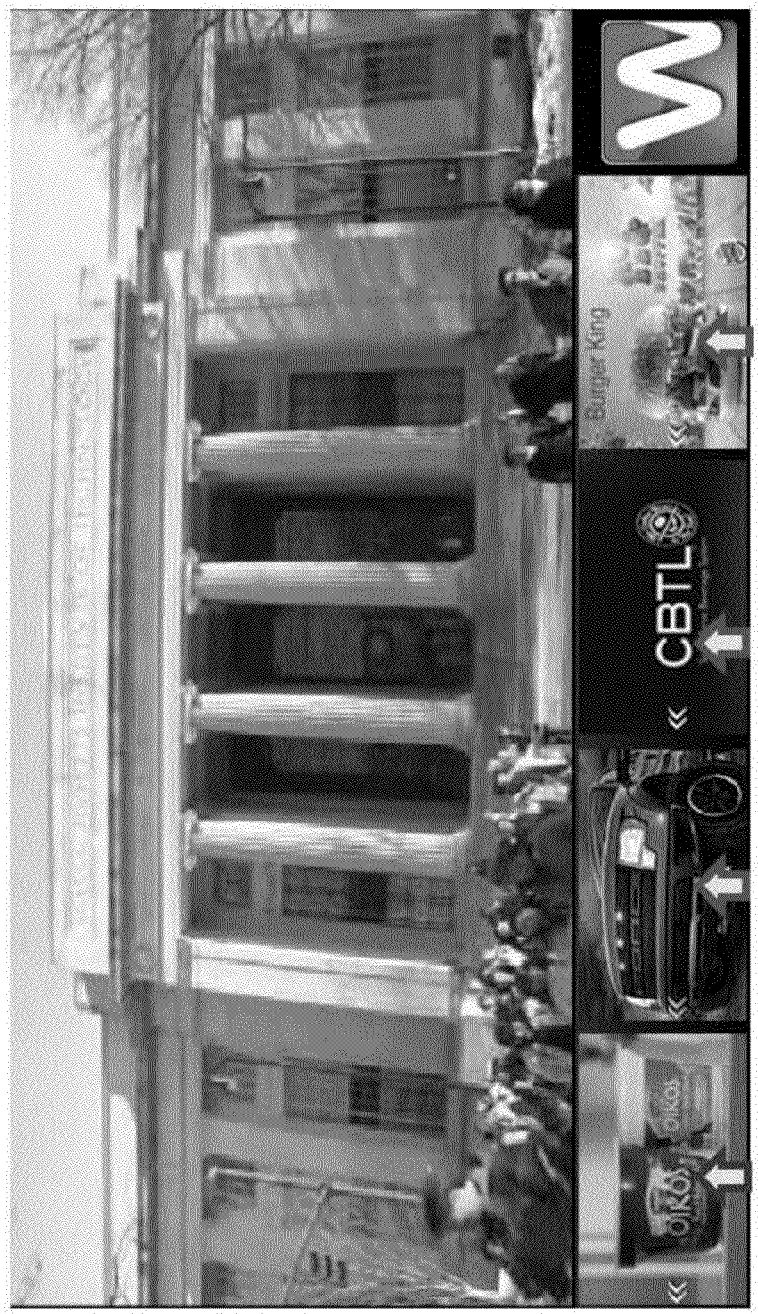
FIGS. 11A-E illustrate example functionality of an embodiment of a video player.
Figure 11B:
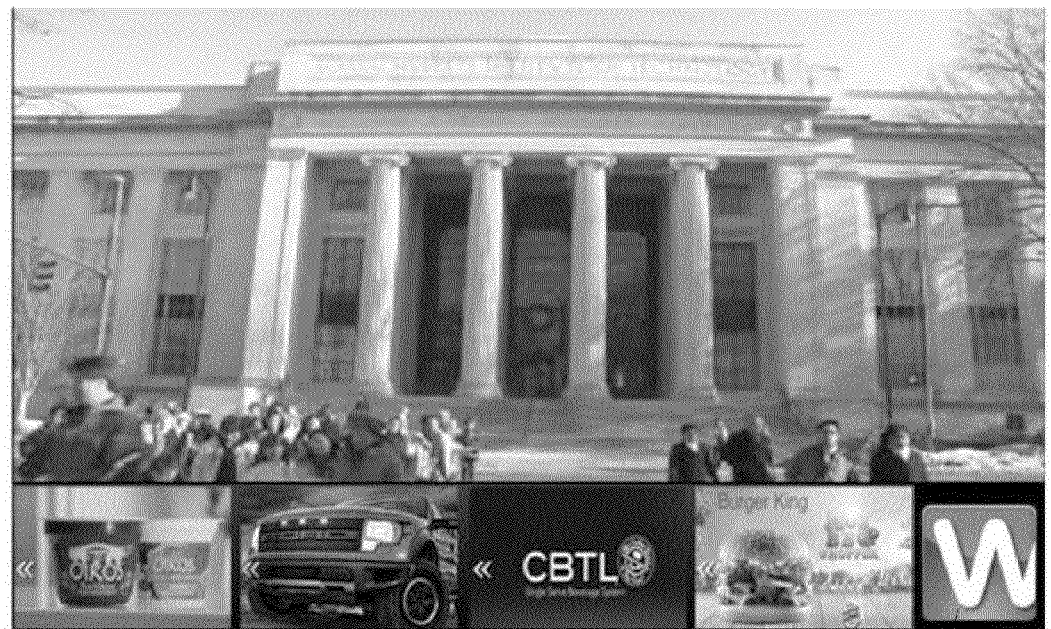
Figure 11C:
Figure 11D:
Figure 11E:
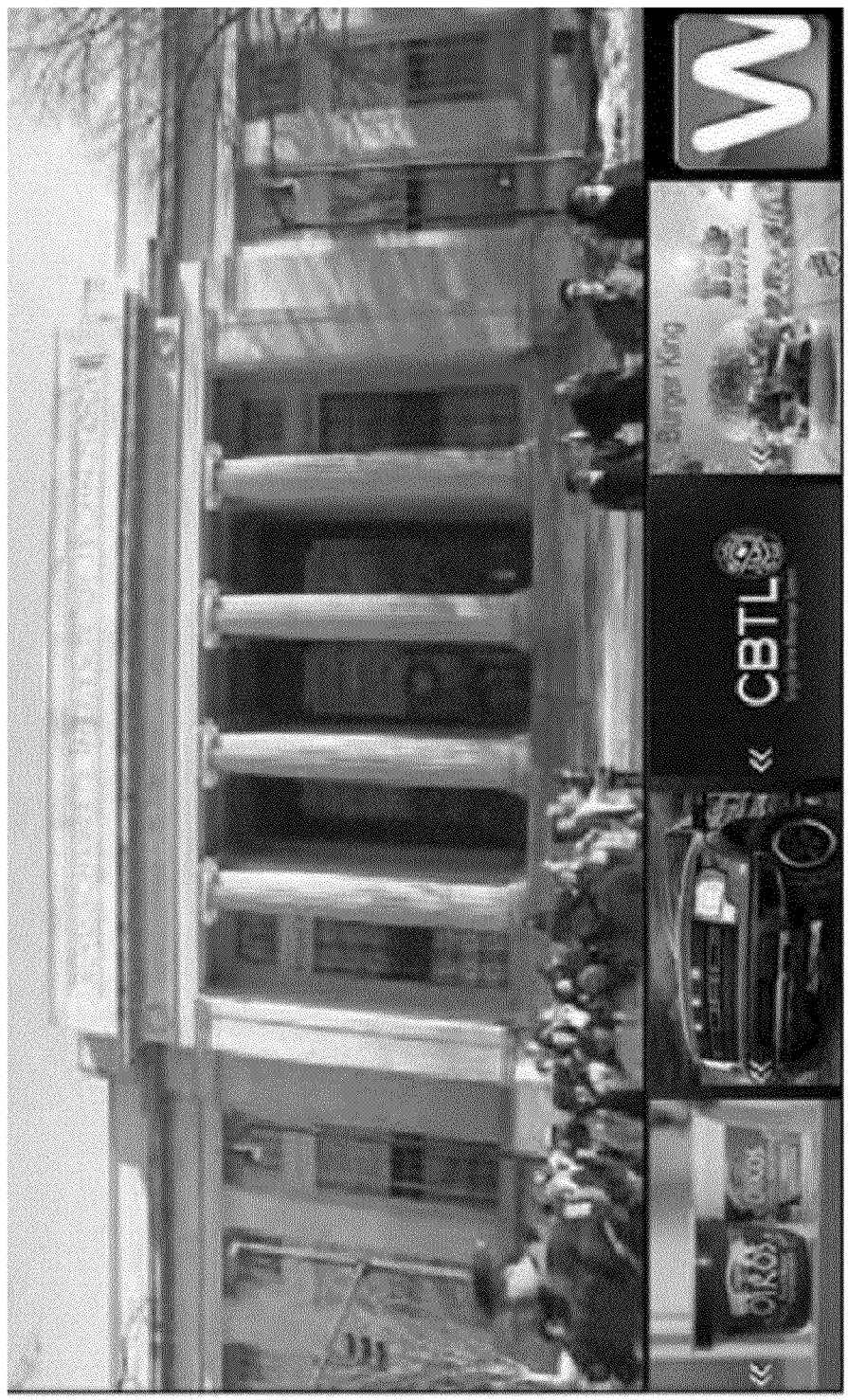

In another example embodiment, a video player may be embedded at a partner third party site—such as a website of television network providing online primary content. The video player may display to the user sponsored and/or non-sponsored content. If a user activates a full screen mode control to maximize the content being displayed, then in an example embodiment, the video player will maximize the window displaying the content, as illustrated in FIG. 11A, while still displaying sponsored content. In addition, as illustrated in FIG. 11B, a control 1102B is optionally provided which, when activated, causes an ecommerce user interface, such as that illustrated in FIG. 11C, to be displayed, as illustrated in FIG. 11D. In this example, the ecommerce user interface provides the user with access to their profile information, their online shopping cart, the ability to purchase items, to add items to a wish list, to view the user's viewing history, etc. When the content displayed in the full screen mode has completed playing, the display reverts to the pre-maximized mode, as illustrated in FIG. 11E.

Figure 12A:
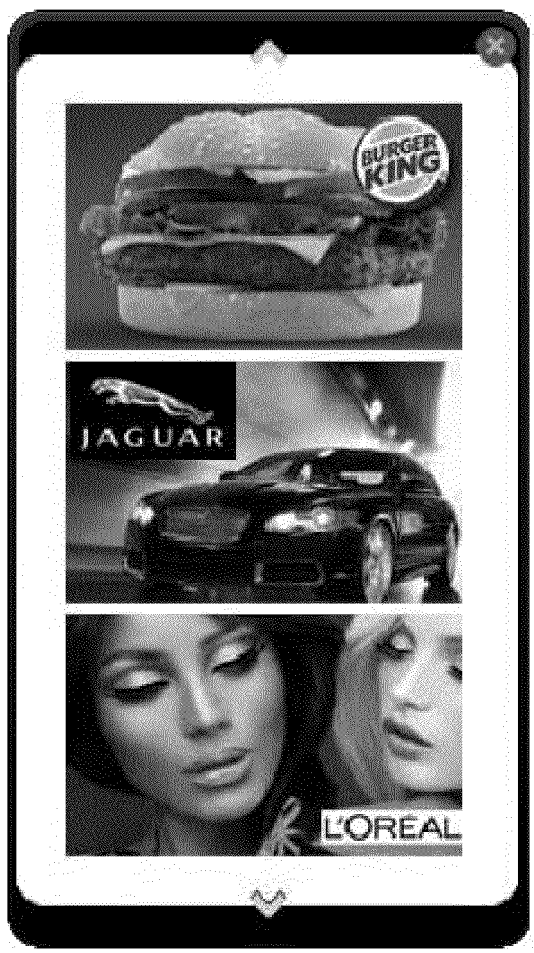
FIGS. 12A-C illustrate additional example user interfaces.

FIG. 12A illustrates an example user interface displaying a visual history listing of sponsored content viewed by the user. The history user interface may be provided for display by the system at least partly in response to the user activating a history control, such as that illustrated in FIG. 1B.

Figure 12B:

The user can select an item of sponsored content from the displayed history listing, and the content will be displayed to the user, as illustrated in FIG. 12B. If the selected content is a static image, the image (or a different image related to the same item) may be presented in a larger format than that displayed in the history listing (e.g., in a full screen mode, half screen mode, etc.), or may be otherwise emphasized to the user (e.g., by fading the intensity of other portions of the user interface being displayed to the user). If the selected content is a frame of content or corresponds to video content (even if it is not a frame from the video content), the video content may be presented in a larger format than that displayed in the history listing and it may be played by a video content player, with an audio track if one is present.

The system may cause additional information to be displayed in association with the selected sponsored content. For example, as illustrated in FIG. 12B, the cost to purchase the advertised item, in terms of legal tender (e.g., $20.99) and/or earned credits (e.g., 175 earned credit minutes), may be displayed to the user. If the user selects a buy control (which may display such item cost), a purchase user interface may be displayed to the user, such as those discussed elsewhere herein, which enables the user to purchase the advertised item.

Figure 12C:

If the user selects a "more information" control provided by the user interface illustrated in FIG. 12B, (which may be otherwise labeled, such as with the name or description of the item being advertised or the control may be the image itself), then the example user interface illustrated in FIG. 12C may be displayed. The "more info" user interface may present additional information regarding the item advertised in the selected sponsored content.

While certain embodiments may be illustrated or discussed as having certain example components, additional, fewer, or different components may be used. Process described as being performed by a server system may be performed by a user terminal or other system or systems. Processes described as being performed by a user terminal may be performed by a sever system or other system or systems. Data described as being accessed from a given source may be stored by and accessed from other sources. Further, with respect to the processes discussed herein, various states may be performed in a different order, not all states are required to be reached, and fewer, additional, or different states may be utilized. User interfaces described herein are optionally presented (and user instructions may be received) via a user computing device using a browser, other network resource viewer, or otherwise. For example, the user interfaces may be presented (and user instructions received) via an application (sometimes referred to as an "app") installed on the user's mobile phone, laptop, pad, desktop, television, set top box, or other terminal. Various features described or illustrated as being present in different embodiments or user interfaces may be combined into the same embodiment or user interface. It is also understood that a content sponsor may sometimes be referred to as the content provider, even if the sponsor does not actually provide the content, but does sponsor is distribution or showing.

The systems and methods disclosed herein can be implemented in hardware, software, firmware, or a combination thereof. Software can include computer readable instructions stored in memory (e.g., non-transitory, tangible memory, such as solid state memory (e.g., ROM, EEPROM, FLASH, RAM), optical memory (e.g., a CD, DVD, Bluray disc, etc.), magnetic memory (e.g., a hard disc drive), etc., configured to implement the algorithms on a general purpose computer, special purpose processors, or combinations thereof. For example, one or more computing devices, such as a processor, may execute program instructions stored in computer readable memory to carry out processed disclosed herein. Hardware may include state machines, one or more general purpose computers, and/or one or more special purpose processors.

While certain embodiments may be illustrated or discussed as having certain example components, additional, fewer, or different components may be used. Further, with respect to the processes discussed herein, various states may be performed in a different order, not all states are required to be reached, and fewer, additional, or different states may be utilized.

While reference may be made to a webpage, other interfaces, such as may be provided via a phone application, a toolbar, an interactive television, or otherwise may be used. While reference may be made to a browser, other applications may be used to view and navigate objects (e.g., web pages or other documents).

Conditional language, such as, among others, "can," "could," "might," or "may," unless specifically stated otherwise, or otherwise understood with the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features elements, and/or steps are included or are performed in any particular embodiment.

Any process descriptions, elements, or blocks in the flow diagrams described herein, and/or depicted in the attached figures, should be understood as potentially representing modules, segments, or portions of code which include one or more executable instructions for implementing specific logical functions or steps in the process. Implementations are included within the scope of the embodiments described herein which elements or functions which may be deleted, depending on the functionality involved, as would be understood by those skilled in the art.

While the disclosure may reference to a user hovering over, pointing at, or clicking on a particular item, other techniques may be used to detect an item of user interest. For example, the user may touch the item via a touch screen, or otherwise indicate an interest.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein. In addition, various features of different embodiments may be combined to form still further embodiments. For example, aspects found in different user interfaces may be combined to form still further user interface.

What is claimed is:

1. A content distribution system, comprising:
   an interface to one or databases storing at least video content;
   a computer system, comprising hardware, coupled to the interface, and computer system configured to perform operations comprising:
   receiving an indication that a first user is accessing an online resource using a user terminal;
   identifying a profile associated with the first user, the profile including:
      preference information,
      demographic information,
      viewing history information, and
      navigation history information;
   accessing specified target information provided by one or more content providers, the specified target information including at least target demographics;
   selecting primary content based at least in part on the first user profile;
   selecting a first plurality of items of supplementary content based at least in part on the first user profile and the specified target information provided by the one or more content providers, wherein items in the first plurality of items of supplementary content includes a video component;
   accessing respective metadata associated with the first plurality of items of supplementary content to determine respective time lengths of items in the first plurality of items of supplementary content;
   causing, at least in part, at least a portion of the selected primary content to be provided for display on the user terminal;
   causing, at least in part, the first plurality of items of supplementary content or representations thereof to be provided for display on the user terminal, wherein the first plurality of items of supplementary content or representations thereof are to be displayed together for at least a period of time;
   causing, at least in part, information regarding the first plurality of items of supplementary content to be provided for display on the user terminal at the same time in association with the first plurality of items of supplementary content or representations thereof being displayed at the same time, the information regarding the first plurality of items of supplementary content including information on the respective time lengths of items in the first plurality of items of supplementary content, and on respective credit amounts to be awarded for viewing items in the first plurality of items of supplementary content, wherein the first user can view, at the same time, the first plurality of items of supplementary content or representations thereof in association with the respective time lengths, and the first user can select among the first plurality of items of supplementary content or representations thereof, being displayed at the same time in association with the respective time lengths;

receiving a selection by the first user of a first item of supplementary content in the first plurality of items of supplementary content, wherein the first item of supplementary content includes a first video component and is associated with a first length and a first redeemable credit amount related to the first length;

causing at least in part the first video component to be provided to the user terminal for playback by the user terminal; and providing a user interface comprising a first control with which the first user is to interact by activating the first control while the first video component is played by the user terminal or within a specified period of time after the video component has been played;

determining if user interaction by the first user with the user interface satisfied or failed to satisfy at least a first criterion; and at least partly in response to determining that user interaction with the user interface failed to satisfy at least the first criterion, inhibiting assignment of the first redeemable credit amount to the first user, at least partly in response determining that user interaction with the user interface satisfied the at least first criterion, assigning the first redeemable credit amount to the first user;

causing at least in part a catalog user interface to be displayed on the user terminal, the catalog user interface including images of a first plurality of articles available for purchase using at least earned credits for viewing content and respective prices expressed in earned credits for viewing content;

receiving a purchase request for a first article, wherein the first article is associated with a first price in the form of a first quantity earned credits for viewing content;

determining if the first user has sufficient accumulated earned credit to purchase the first article at the first price;

at least partly in response to the purchase request and the determination that the first user has sufficient accumulated earned credit, including the first redeemable credit amount, to purchase the first article, causing, at least in part, the first article to be provided by the first user and deducting the first quantity of earned credit from an account associated with the first user.

2. The system as defined in claim 1, wherein the system is configured to inhibit the assignment of the first redeemable credit amount to the first user if the received indication indicates that the first video component was not completely played by the user terminal.

3. The system as defined in claim 1, the operations further comprising providing a user interface configured to receive profile information from the first user, including at least information regarding genres of content the first user prefers and personalities the first user is interested in, and utilizing the received profile information to select both primary and supplemental content.

4. The system as defined in claim 1, the operations further comprising offering an item for purchase to the first user substantially immediately after the first item of content is played by the user terminal, wherein the offer includes a price expressed in earned credits for viewing content.

5. The system as defined in claim 1, the operations further comprising:
providing information on a first location to the first user with respect to where the first article is available for pickup;
accessing a photograph of the first user;
generating a receipt for the purchase of the first article, the receipt including the photograph of the first user and an identification of the first article,
wherein the receipt is to be used to verify, at the first location, that the first user is authorized to pick up the first article.

6. The system as defined in claim 1, the operations further comprising:
providing for display, in association with the first article a respective price expressed in legal tender.

7. The system as defined in claim 1, the operations further comprising:
at least partly in response to the completion of the purchase of the first article be the first user, determining whether a membership level of the first user is to be enhanced to provide one or more benefits to the first user that the first user was previously not entitled to.

8. The system as defined in claim 1, the operations further comprising:
receiving a value indicating how much supplemental content the first user viewed over a first period of time;
at least partly in response to determining that the value indicates that the first user viewed more than a first amount of content, assigning the first user a first enhanced benefits package, the first enhanced benefits package having one or more benefits than the first user was entitled to prior to the assignment of the first enhanced benefits package;
at least partly in response to determining that the value indicates that the first user viewed more than a second amount of content, assigning the first user a second enhanced benefits package, the second enhanced benefits package having one or more benefits than the first enhanced benefits package.

9. The system as defined in claim 1, wherein the information on the respective time lengths and the information on the respective credit amounts are the same.

10. The system as defined in claim 1, the operations further comprising automatically causing a second plurality of items of supplemental content to be displayed on the user terminal in place of the first plurality of items a first period of time after the first plurality of items of supplemental content is displayed on the user terminal.

11. The system as defined in claim 1, the operations further comprising providing a multidimensional targeting array for display on a terminal of a first content provider, the multidimensional targeting array including a first axis corresponding to categories and a second axis corresponding to demographics, wherein the first content provider can specify target parameters by selecting a plurality of intersections within the targeting user array and utilizing the selected intersections in determining which users one or more items of supplemental content is to be displayed to.

12. A content distribution system, comprising:
an interface to one or databases storing at least video content;

a computer system, comprising hardware, coupled to the interface, and computer system configured to perform operations comprising:

selecting a first plurality of items of content for display on a user terminal of a user;

accessing information indicating respective time lengths and/or qualifying viewing times corresponding to items of content in the first plurality of items of content;

causing, at least in part, the first plurality of items of content or representations thereof to be provided for display on the user terminal, wherein the first plurality of items of content or representations thereof are to be displayed together, at the same time, for at least a period of time, in association with the respective time lengths and/or qualifying viewing times, wherein the user can view, at the same time, the first plurality of items of content or representations thereof in association with the respective time lengths and/or qualifying viewing times, and the user can select among the first plurality of items of content or representations thereof, being displayed at the same time in association with the respective time lengths and/or qualifying viewing times;

enabling the user to select at least one of the items of content from the first plurality of items of content;

in response to a user selection, causing, at least in part, a first item of content, having a first time length, included in the first plurality of items of content to be distinctly presented by the user terminal; and causing, at least in part, a countdown timer to be displayed in association with a first control on the user terminal, wherein the countdown timer is displayed at least after a first amount of the first item of content has been displayed on the user terminal;

determining if the user activated the first control before the countdown timer counts down to a first value; and at least partly in response to determining the user activated the first control before the countdown timer counts down to the first value, assigning a first amount of redeemable credits to the user, wherein the first amount of redeemable credits magnitude is related to the first length of time;

causing at least in part a catalog user interface to be displayed on the user terminal, the catalog user interface comprising: images of a first plurality of articles available for purchase using at least redeemable credits, and respective prices expressed in redeemable credits;

receiving a purchase request for a first article, wherein the first article is associated with a first price in the form of a first quantity redeemable credits;

determining if the user has sufficient accumulated redeemable credits to purchase the first article at the first price;

at least partly in response to the purchase request and the determination that the user has sufficient accumulated redeemable credits to purchase the first article, causing, at least in part, the first article to be provided by the user and deducting the first quantity of redeemable credits from an account associated with the user.

13. The system as defined in claim 12, wherein the first plurality of items of content includes at least items of video content.

14. The system as defined in claim 12, wherein the first plurality of items of content includes at least items of video content and a still image item.

15. The system as defined in claim 12, wherein the redeemable credits may only be redeemed for products from a specified source.

16. The system as defined in claim 12, wherein the redeemable credits may only be redeemed for products presented in at least one of the first plurality of items of content.

17. The system as defined in claim 12, the operations further comprising:

providing a value for the first item expressed in currency.

18. The system as defined in claim 12, the operations further comprising:

providing, for display, a value for the first item expressed in legal tender; and receiving a user specified number, the user specified number corresponding to a number of redeemable credits, wherein the number of redeemable credits is less than the value price for the first item expressed in redeemable credits; and calculating a legal tender amount based at least in part on the user specified number corresponding to the number of redeemable credits, wherein the combination of currency corresponding to the calculated legal tender amount and the number of redeemable credits corresponding to the user specified number is sufficient to acquire the first item.

19. The system as defined in claim 12, the operations further comprising:

determining how much the user has spent acquiring items from at least a first source during a first period of time;

if the user has spent less than a first threshold, enabling the user to earn redeemable credits up to a first limit; and if the user has spent an amount equal to or greater than the first threshold, enabling the user to earn redeemable credits up to a second limit, wherein the second limit is greater than the first limit.

20. The system as defined in claim 12, the operations further comprising, offering the user free products selected based at least in part on an amount of a first type of content viewed by the user, wherein the user does not have to provide legal tender or redeemable credits to obtain the free products.

21. The system as defined in claim 12, the operations further comprising:

storing a history of content viewed by the user;

enabling the user to access at least a portion of the history;

receiving a selection from the user of at least one item of content from the accessed history;

at least partly in response to the user selection of the at least one item of content, offering for acquisition at least one product associated with the selected at least one item of content.

22. A method of distributing content, the method comprising:

selecting by a computer system a first plurality of items of content for display on a user terminal of a user;

accessing by the computer system information indicating respective time lengths and/or qualifying viewing times corresponding to items in the first plurality of items of content;

the computer system causing, at least in part, the first plurality of items of content or representations thereof to be provided for display on the user terminal, wherein the first plurality of items of content or representations thereof are to be displayed at the same time together for at least a period of time, in association with the respective time lengths and/or qualifying viewing times;

enabling, by the computer system, the user to select at least one of the items of content from the first plurality of items of content, wherein the user can view, at the same time, the first plurality of items of content or representations thereof in association with the respective time lengths and/or qualifying viewing times, and the user can select among the first plurality of items of content or representations thereof, being displayed at the same time in association with the respective time lengths and/or qualifying viewing times;

in response to a user selection, causing by the computer system, at least in part, a first item of content, having a first time length, included in the first plurality of items of content to be distinctly presented by the user terminal; and providing, by the computer system, a user interface comprising a first control with which the user is to interact while the first item of content is distinctly presented by the user terminal or within a specified period of time after the first item of content has been played;

determining, by the computer system, if user interaction with the user interface, comprising the first control, satisfied or failed to satisfy at least a first criterion; and at least partly in response to determining that user interaction with the user interface failed to satisfy at least the first criterion, inhibiting assignment a first amount of redeemable credits to the user, at least partly in response determining that user interaction with the user interface satisfied the at least first criterion, assigning by the computer system a first amount of redeemable credits to the user, wherein the first amount of redeemable credits magnitude is related to the first time length;

causing at least in part a catalog user interface to be displayed on the user terminal, the catalog user interface including images of a first plurality of articles available for purchase using at least redeemable credits and respective prices expressed in redeemable credits;

receiving a purchase request for a first article, wherein the first article is associated with a first price in the form of a first quantity redeemable credits;

determining if the user has sufficient accumulated redeemable credits to purchase the first article at the first price;

at least partly in response to the purchase request and the determination that the user has sufficient accumulated redeemable credits, including the first amount of redeemable credit, to purchase the first article, causing, at least in part, the first article to be provided by the user and deducting the first quantity of redeemable credits from an account associated with the user.

23. The method as defined in claim 22, wherein the first plurality of items of content includes at least items of video content;

providing, for display, a value for the first item expressed in legal tender;

receiving a user specified number, the user specified number corresponding to a number of redeemable credits, wherein the number of redeemable credits is less than the price for the first item expressed in redeemable credits; and calculating a legal tender amount based at least in part on the user specified number corresponding to the number of redeemable credits, wherein the combination of currency corresponding to the calculated legal tender amount and the number of redeemable credits corresponding to the user specified number is sufficient to acquire the first item.

24. The method as defined in claim 22, wherein the redeemable credits may be redeemed for products, the method further comprising:

determining how much the user has spent acquiring items from at least a first source during a first period of time;

if the user has spent less than a first threshold, enabling the user to earn redeemable credits up to a first limit; and if the user has spent an amount equal to or greater than the first threshold, enabling the user to earn redeemable credits up to a second limit, wherein the second limit is greater than the first limit.

25. The method as defined in claim 22, the method further comprising, offering the user free products selected based at least in part an amount of a first type of content viewed by the user, wherein the user does not have to provide legal tender or redeemable credits to obtain the free products.

26. The method as defined in claim 22, the method further comprising:

storing a history of content viewed by the user;

enabling the user to access at least a portion of the history;

receiving a selection from the user of at least one item of content from the accessed history;

at least partly in response to the user selection of the at least one item of content, offering for acquisition at least one product associated with the selected at least one item of content.

27. A non-transitory computer readable medium storing programmatic instructions thereon, which when executed, are configured to cause a computer system comprising hardware to perform operations comprising:

selecting a first plurality of items of content for display on a user terminal of a user;

accessing information indicating respective time lengths and/or qualifying viewing times corresponding to items in the first plurality of items of content;

causing, at least in part, the first plurality of items of content or representations thereof to be provided for display on the user terminal, wherein the first plurality of items of content or representations thereof are to be displayed at the same time together for at least a period of time, in association with the respective time lengths and/or qualifying viewing times;

enabling the user to select at least one of the items of content from the first plurality of items of content, wherein the user can view, at the same time, the first plurality of items of content or representations thereof in association with the respective time lengths and/or qualifying viewing times, and the user can select among the first plurality of items of content or representations thereof, being displayed at the same time in association with the respective time lengths and/or qualifying viewing times;

in response to a user selection, causing, at least in part, a first item of content, having a first time length, included in the first plurality of items of content to be distinctly presented by the user terminal; and providing a user interface comprising a first control with which the user is to interact while the first item of content is distinctly presented by the user terminal or within a specified period of time after the first item of content has been played;

determining if user interaction with the user interface comprising the first control satisfied or failed to satisfy at least a first criterion; and at least partly in response to determining that user interaction with the user interface failed to satisfy at least the first criterion, inhibiting assignment a first amount of redeemable credits to the user, at least partly in response determining that user interaction with the user interface satisfied the at least first criterion, assigning one or more redeemable credits to the user in an amount related to the first time length causing at least in part a catalog user interface to be displayed on the user terminal, the catalog user interface comprising: images of a first plurality of articles available for purchase using at least redeemable credits, and respective prices expressed in redeemable credits;

receiving a purchase request for a first article, wherein the first article is associated with a first price in the form of a first quantity redeemable credits;

determining if the user has sufficient accumulated redeemable credits to purchase the first article at the first price;

at least partly in response to the purchase request and the determination that the user has sufficient accumulated redeemable credits, including the first amount of redeemable credit, to purchase the first article, causing, at least in part, the first article to be provided by the user and deducting the first quantity of redeemable credits from an account associated with the user.

* * * * *